(12) United States Patent
Johnson et al.

(10) Patent No.: US 12,536,173 B1
(45) Date of Patent: Jan. 27, 2026

(54) FACILITATING A COLLABORATIVE SESSION OF A LARGE LANGUAGE MODEL FOR A PLURALITY OF USERS

(71) Applicant: Dropbox, Inc., San Francisco, CA (US)

(72) Inventors: Jessica D. Johnson, San Marcos, CA (US); Rajkumar Janakiraman, Sammamish, WA (US); Ranjitha Gurunath Kulkarni, Sunnyvale, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/199,024

(22) Filed: May 5, 2025

(51) Int. Cl.
*G06F 16/24* (2019.01)
*G06F 16/2453* (2019.01)

(52) U.S. Cl.
CPC ............... *G06F 16/24542* (2019.01)

(58) Field of Classification Search
None
See application file for complete search history.

(56) References Cited

U.S. PATENT DOCUMENTS

| | | | |
|---|---|---|---|
| 8,274,360 B2 | 9/2012 | Sampath et al. | |
| 8,310,336 B2 | 11/2012 | Muhsin et al. | |
| 9,142,117 B2 | 9/2015 | Muhsin et al. | |
| 9,443,098 B2 | 9/2016 | Burge | |
| 9,496,987 B2 | 11/2016 | Naaman et al. | |
| 9,881,174 B2 | 1/2018 | Burge | |
| 10,169,410 B2 | 1/2019 | Merx et al. | |
| 2013/0096936 A1 | 4/2013 | Sampath et al. | |
| 2013/0173569 A1* | 7/2013 | Pearcy | G06F 16/9538 707/706 |
| 2018/0129817 A1 | 5/2018 | Burge | |
| 2020/0177403 A1 | 6/2020 | Vazquez-Rivera et al. | |
| 2025/0005523 A1* | 1/2025 | Katta | G06F 21/31 |
| 2025/0138909 A1* | 5/2025 | Mahajan | G06F 9/541 |
| 2025/0165648 A1* | 5/2025 | Gomez | G06F 21/6254 |
| 2025/0200294 A1* | 6/2025 | Shin | G06F 16/334 |

FOREIGN PATENT DOCUMENTS

WO 2025015290 A1 1/2025

* cited by examiner

*Primary Examiner* — Augustine K. Obisesan
(74) *Attorney, Agent, or Firm* — Keller Preece PLLC

(57) ABSTRACT

The present disclosure relates to systems, non-transitory computer-readable media, and methods for combining sessions of a large language model. For instance, the disclosed systems can receive a first query from a first collaborating user account and a second query from a second collaborating user account. In one or more cases, the disclosed systems can generate a merged prompt based on the from the first query and second query. In some implementations, the disclosed systems can generate a response to the first query and/or the second query by processing the merged prompt utilizing the large language model.

20 Claims, 12 Drawing Sheets

FACILITATING A COLLABORATIVE SESSION OF A LARGE LANGUAGE MODEL FOR A PLURALITY OF USERS

BACKGROUND

Recent years have seen significant developments in artificial intelligence (AI) software and usage of large language models. Indeed, the increased popularity of large language models and the ever-evolving context of the internet has led to AI, and more specifically large language models, generating, summarizing, translating, and classifying digital content. For example, large language models can perform tasks ranging from summarizing notes to generating images. Based on these capabilities, some existing systems utilize large language models with assistants (or agents) to perform various tasks. Despite these advances, however, existing systems utilizing assistants in conjunction with large language models continue to suffer from a number of disadvantages, particularly in terms of flexibility and efficiency.

As just suggested, certain systems using assistants with large language models are inflexible. In particular, existing systems are designed to support single-user interactions or conversations with a large language model. Consequently, such existing systems cannot support multiple users synchronously or asynchronously interacting with a large language model in a shared session. Indeed, existing systems cannot adapt to multi-user interactions with large language models and are instead limited to single-user sessions.

In addition to their flexibility issues, existing systems are also inefficient. For example, when recalling context from a prior individual session of a large language model, some existing large language model systems tokenize the query, responses, and content items (e.g., documents) for an entire conversation (potentially including many turns) of the prior individual session. The computational expense of processing and tokenizing the text-based conversation to obtain context for subsequent interactions is computationally expensive and only becomes more so as the conversation grows larger (e.g., growing exponentially with each new query as every previous query is repeatedly retokenized). As a result, prior systems use excessive computational resources, such as processing power and memory, when determining context for continuing a conversation.

Additionally, existing systems further suffer from insecurity. Certain existing systems are unable to distinguish between private and distributable or shareable data used within the individual sessions of the large language model. Indeed, some systems treat stored user account data indiscriminately with a one-size-fits-all approach, often retrieving private data for processing and use by a large language model. Thus, conventional systems often expose sensitive data and compromise the security of user accounts when interacting with a large language model.

SUMMARY

This disclosure describes one or more embodiments of systems, methods, and non-transitory computer-readable storage media that provide benefits and/or solve one or more of the foregoing and other problems in the art. For instance, the disclosed systems can receive multiple queries from a plurality of user accounts within a group for a large language model and merge one or more sessions of the large language model by merging the state of an agent (e.g., interpreter) from the one or more sessions. In particular, the disclosed systems can receive a first query from a first user account and a second query from a second user account collaborating with the first user account. In one or more cases, from the first query and second query, the disclosed systems can generate a merged prompt that reflects the states of the agent while receiving the first query and the second query. In some implementations, the disclosed systems can generate a response to the first query and/or the second query by processing the merged prompt utilizing a large language model.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

This disclosure describes one or more embodiments of a collaborative interpreter system that can combine sessions associated with collaborating user accounts interacting (e.g., synchronously or asynchronously) with a large language model. In some cases, the collaborative interpreter system can combine the relevant and/or related portions of one or more distinct (or individual) sessions of the large language model associated with different collaborating user accounts by merging the states of an agent (e.g., interpreter) linked to the large language model according to a context window algorithm. For example, the collaborative interpreter system can receive a first query from a first collaborating user account and a second query from a second collaborating user account. In some cases, the collaborative interpreter system can generate a merged prompt for the first query and second query by combining information related to the first query and second query according to the context window algorithm. For example, the collaborative interpreter system can generate the merged prompt based on a topic or workflow associated with the first query and the second query. Additionally, in some embodiments, the collaborative interpreter system can generate a response by processing the merged prompt with the large language model and can provide the response to the first collaborating user account and the second collaborating user account.

Figure 1:
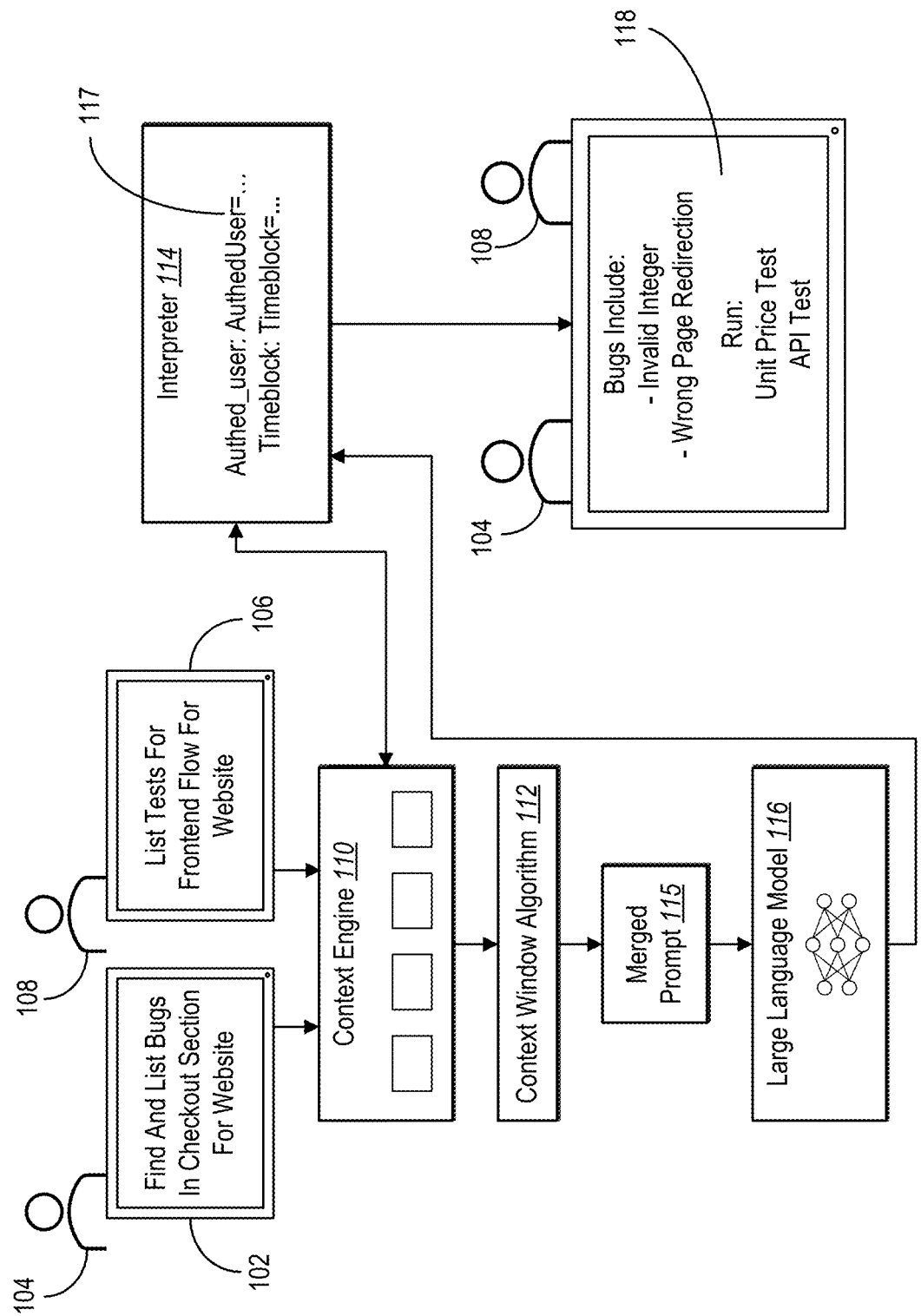
FIG. 1 illustrates an example overview of a collaborative interpreter system generating a response by processing a merged prompt with a large language model in accordance with one or more embodiments.

As just mentioned, the collaborative interpreter system can generate a response for multiple collaborating user accounts associated with multiple sessions (or instances) of a large language model by generating a merged prompt. FIG. 1 illustrates an example overview of a collaborative interpreter system generating a response by processing a merged prompt with a large language model in accordance with one or more embodiments. Additional detail regarding the various acts and processes introduced in relation to FIG. 1 is provided thereafter with reference to subsequent figures.

In one or more embodiments, the collaborative interpreter system 100 can receive a first query 102 from a client device associated with a first collaborating user account 104 and a second query 106 from a client device associated with a second collaborating user account 108. As shown in FIG. 1, a context engine 110 can process the first query 102 and the second query 106 to generate a merged prompt 115 that comprises previously generated results (or responses), example functions, content items, queries, etc., from one or more previous sessions of the large language model 116 and interpreter 114 (or agent) with the first collaborating user account 104 and the second collaborating user account 108.

In one or more embodiments, the collaborative interpreter system 100 can determine relevant data to include in the merged prompt 115 by utilizing a context window algorithm 112. In some cases, the context window algorithm 112 can select the relevant data (e.g., example functions, text queries, results, variables) based on time, semantic similarity, visual similarity, security settings, privacy considerations, and/or relationships between the first collaborating user account 104 and the second collaborating user account 108. In some cases, the context window algorithm 112 can determine the relevant data based on the context (e.g., theme, topic, subject) of the first query 102 and/or the second query 106.

For example, the first query 102 reads, "Find and list bugs in checkout section for the website," and the second query 106 reads, "List tests for frontend flow for website." Based on the topic relating to dealing with bugs on the backend of a website, the collaborative interpreter system 100 can pull in contextual data. For instance, the collaborative interpreter system 100 can retrieve one or more contextual data items, including queries, prompts, example functions, results, and/or content items of sessions with the large language model 116 (and the interpreter 114) associated with the first collaborating user account 104, where the contextual data items relate to bugs in the backend section of the website. The collaborative interpreter system 100 can further include the contextual data items in the merged prompt 115, either in original form or as a text description or summary of the content. Relatedly, in one or more implementations, the collaborative interpreter system 100 can further pull in one or more additional contextual data items, such as queries, prompts, example functions, results, and/or content items of the one or more additional sessions with the large language model 116 (and the interpreter 114) associated with the second collaborating user account 108, where the additional contextual data items relate to tests for the backend of the website based on the identified bugs. The collaborative interpreter system 100 can further include the additional contextual data items in the merged prompt 115.

In some cases, before providing the merged prompt 115 to the large language model 116 for processing, the collaborative interpreter system 100 can resolve one or more conflicts, overlaps, security regulations, and/or privacy issues among one or more parameters (or variables) within the merged prompt 115 and/or a merged state by utilizing data (or type) propagation. In particular, the collaborative interpreter system 100 can propagate sources and/or type information of the data within the merged prompt 115 and/or merged state to determine what to include in the merged prompt 115 (and what to omit, such as redundant data from different queries or contextual data to be merged) and/or the merged state based on the plurality of collaborating user accounts interacting with the large language model 116.

As further shown in FIG. 1, the collaborative interpreter system 100 can generate computer code 117 by processing the merged prompt 115 with the large language model 116. In some cases, the collaborative interpreter system 100 can generate a response 118 by executing the computer code 117 with the interpreter 114. For example, the interpreter 114 can perform one or more tasks by executing one or more functions within the computer code 117. As shown in FIG. 1, the collaborative interpreter system 100 can generate a response 118 with a list of bugs reading "Invalid integer" and "Wrong page redirection" along with "run unit tests and API tests." FIG. 1 illustrates that the collaborative interpreter system 100 can pull together separate sessions, threads, or conversations of various collaborating user accounts with the large language model 116 and utilize the context of the sessions to efficiently and accurately generate the response 118 with relevant data.

In some cases, the collaborative interpreter system 100 can receive the first query 102 before receiving the second query 106 and process the first query 102 with a context engine 110, large language model 116, and/or interpreter 114 before processing the second query 106. In particular, the collaborative interpreter system 100 can generate a first state of the interpreter 114 associated with the first query 102. In some cases, the first state of the interpreter 114 can reflect computer code executed by the interpreter 114, parameters (or variables) within the computer code, and the first prompt associated with the first query 102.

As suggested above, the collaborative interpreter system 100 can provide several improvements or advantages over existing large language model systems. For example, the collaborative interpreter system 100 can provide an entirely new function not found in prior systems. Specifically, the collaborative interpreter system 100 can facilitate collaborative interactions with a large language model, where multiple user accounts participate synchronously (e.g., simultaneously or contemporaneously) in a merged session with the large language model. To facilitate collaborative sessions, the collaborative interpreter system 100 utilizes a context engine and/or an interpreter to generate merged prompts and/or merged states for user accounts interacting with the large language model.

Through this new functionality, the collaborative interpreter system 100 can provide improved flexibility over many existing large language model systems. While some large language model and agent systems can track the context of a multi-turn conversation for a single-user session of a large language model, these systems cannot facilitate combined sessions with multiple user accounts. As part of their deficiencies, existing systems cannot accurately combine relevant information from different user-account sessions with the large language model. The collaborative interpreter system 100, by contrast, uses a unique architecture that includes the context engine and the interpreter working in conjunction with the large language model to combine data from individual sessions by pulling in relevant information to generate a collaborative, merged session. In addition, the collaborative interpreter system 100 can flexibility adapt to generate an accurate, context aware response for the collaborative session by selecting relevant data from the individual sessions according to a sliding context window algorithm.

In addition to improving upon accuracy of conventional systems, in some embodiments, the collaborative interpreter system further improves upon efficiency. Unlike conventional systems, which generally reprocess or tokenize the entirety of prior individual sessions to recall previous context, the collaborative interpreter system 100 can merge individual states of an interpreter to recall context. Indeed, prior systems generally require storing, processing, and retokenizing the text of previous sessions to recall context of prior conversations. The collaborative interpreter system 100 greatly reduces the computational expense and storage requirements of determining conversation context by generating and storing interpreter states in (strongly typed) computer code format. The code of an interpreter state is not only smaller and more efficient to store and execute, but it is also deterministic whereas analyzing text-based queries using a large language model is highly variable.

On top of improved efficiency, the collaborative interpreter system 100 is more secure than existing systems. For example, when accessing information from a user account for a conversation with a large language model, conventional systems are often unable to determine or distinguish private information from shared information among a plurality of user accounts. Thus, conventional systems share information from with the large language model on an all-or-nothing basis. Unlike such systems, the data structure of the interpreter (with its merged state) allows the collaborative interpreter system 100 to distinguish between private and shareable data, even for multiple user accounts in a collaborative session. In particular, the merged state can indicate the source of the information as well as permissions tied to the source. Thus, the collaborative interpreter system 100 can ensure that the private information of one user account is not shared with other user accounts and/or the large language model.

As illustrated by the foregoing discussion, the present disclosure utilizes a variety of terms to describe features and benefits of the collaborative interpreter system 100. Additional detail is hereafter provided regarding the meaning of these terms as used in this disclosure. As used herein, the term "query" (or text query) includes or refers to data or a specific model output request in the form of input to search for information within a system and/or to generate information using a large language model. In some cases, a query can be a text query using natural language, requesting a large language model to perform a specific task. Moreover, in some instances, the collaborative interpreter system 100 extracts data from a query. Specifically, the collaborative interpreter system 100 can extract natural language structured programmatic data from a query. Thus, in some instances, the collaborative interpreter system 100 generates computer code (e.g., utilizing the context engine interacting with the large language model) in response to extracting natural language structured programmatic data from a query.

As mentioned above, the collaborative interpreter system 100 utilizes a context engine. As used herein, the term "context engine" includes or refers to a model (e.g., a machine learning model) that works in conjunction with a large language model to break down text queries into one or more prompts and to generate computer code from the one or more prompts. For instance, a context engine can determine, based on the query, one or more multi-turn examples to include in the prompt that instruct a large language model to generate computer code for execution by an interpreter. In some embodiments, the collaborative interpreter system 100 utilizes the context engine (e.g., context engine) as described by Rajkumar Janakiraman in U.S. patent application Ser. No. 18/309,496, titled GENERATING MULTI-ORDER TEXT QUERY RESULTS UTILIZING A CONTEXT ORCHESTRATION ENGINE, filed on Apr. 28, 2023, which is hereby incorporated by reference in its entirety. In one or more interpretations, the collaborative interpreter system 100 utilizes the context engine as described by James Johnson in U.S. patent application Ser. No. 18/482,715, titled CUSTOM INTERPRETER FOR EXECUTING COMPUTER CODE GENERATED BY A LARGE LANGUAGE MODEL, filed on Oct. 6, 2023, which is hereby incorporated by reference in its entirety.

As used herein, the term "collaborating user accounts" can include or refer to user accounts interacting with an instance or session of a large language model. In particular, collaborating user accounts can include a plurality of user accounts working together while interacting with a session of the large language model. For example, collaborating user accounts can work together in a collaborative session (or single session) with the large language model in a synchronous fashion where the user accounts simultaneously or contemporaneously participate in the session. In some cases, collaborating user accounts interact with the session of the large language model asynchronously where some user accounts are offline while others are online participating in a session with the large language model, and where an offline user account later comes online to participate in the ongoing session.

As used herein, the term "merged prompt" can include or refer to a large language model prompt that is combined or merged (e.g., from user-account-specific prompts) to facilitate a collaborative session. As generated by a context engine, a merged prompt can include instructions (combined from data associated with collaborating user accounts) on how to generate computer code for an agent (e.g., interpreter) to execute. In some cases, the merged prompt can include one or more example functions that the large language model can use to generate the computer code for the agent. For example, in some cases, the merged prompt can include one or more example functions for the large language model to generate for a mathematic agent. Relatedly, the merged prompt can include one or more multi-turn examples for the large language model to generate for the interpreter. Additionally, in some cases, a merged prompt can include one or more instructions from one or more queries, prompts, and/or results from previous sessions (or instances) of one or more collaborating user accounts with a large language model.

As mentioned above, the context engine includes or refers to a machine learning model. In one or more embodiments, a "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Similarly, a "neural network" includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components that, when trained, form a large language model.

Along these lines, as used herein, the term "large language model" includes or refers to one or more neural networks capable of processing natural language text to generate outputs that range from predictive outputs, analyses, or combinations of data within stored content items. In particular, a large language model can include parameters trained (e.g., via deep learning) on large amounts of data to learn patterns and rules of language for summarizing and/or generating digital content. Examples of a large language model include BLOOM, Bard AI, ChatGPT, LaMDA, DialoGPT, DropboxGPT, and Dropbox FileGPT.

As mentioned above, the collaborative interpreter system 100 utilizes an interpreter to run computer code generated by a large language model. As used herein, the term "interpreter" includes or refers to a software or application program that reads and executes computer code (e.g., source code). In some cases, the interpreter can execute computer code written in a high-level programming language. For instance, the interpreter can read computer code line by line, statement by statement, or instruction by instruction and can execute the code without converting it into machine code. In some cases, an interpreter can also or alternatively translate the computer code into machine code or another representation. Moreover, in some instances, the interpreter does not utilize a separate compilation step to run computer code.

As used herein, the term "digital content item" ("source content item" or simply "content item") refers to a digital object or a digital file that includes information interpretable by a computing device (e.g., a client device) to present information to a user. A content item can include a file or a folder such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is specific to a particular computer application and is accessible via a file system or via a network connection. A content item can be editable or otherwise modifiable and can also be sharable from one user account (or client device) to another. In some cases, a content item is modifiable by multiple user accounts (or client devices) simultaneously and/or at different times.

Figure 2A:
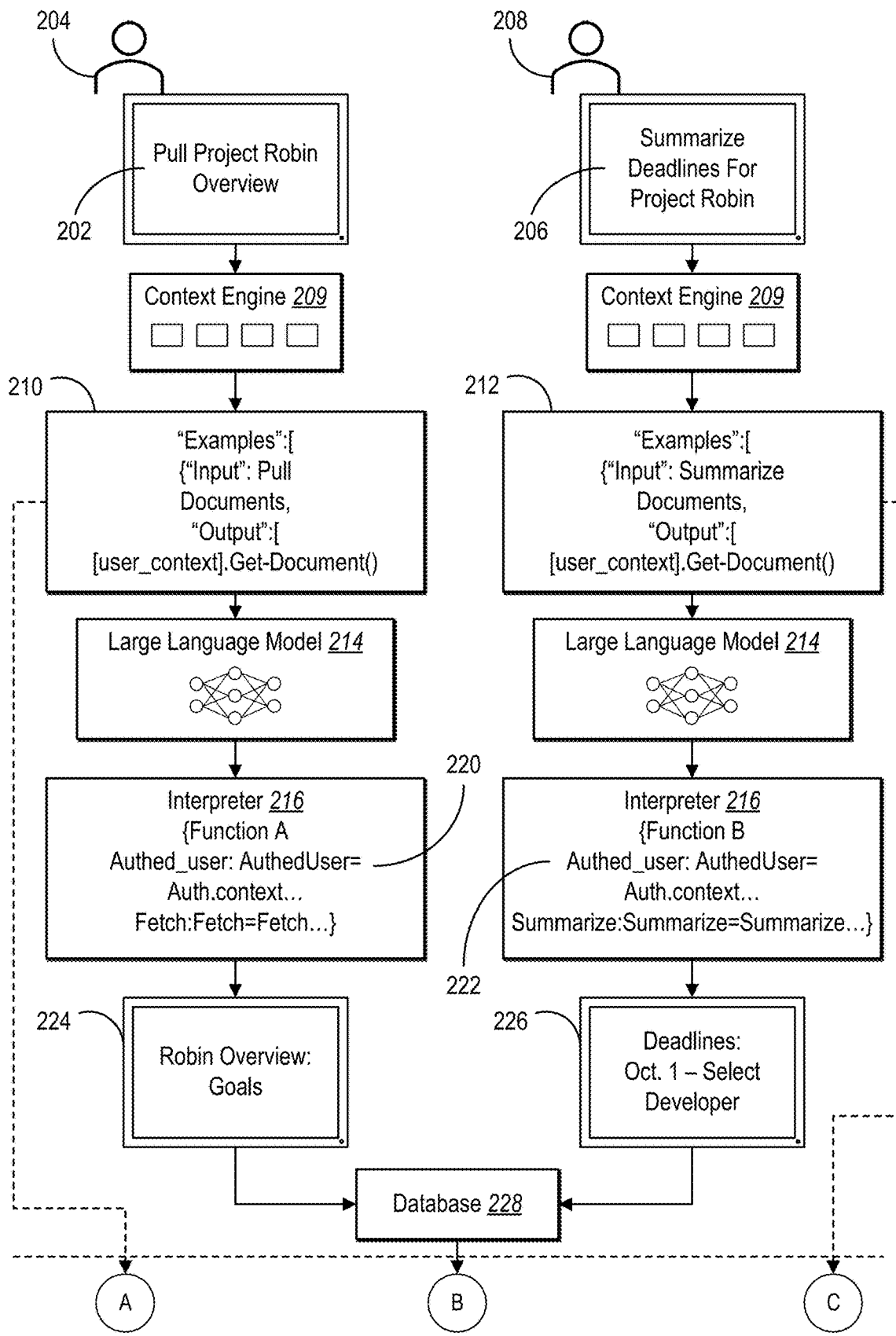
FIGS. 2A-2B illustrate a collaborative interpreter system generating a merged prompt in accordance with one or more embodiments.
Figure 2B:
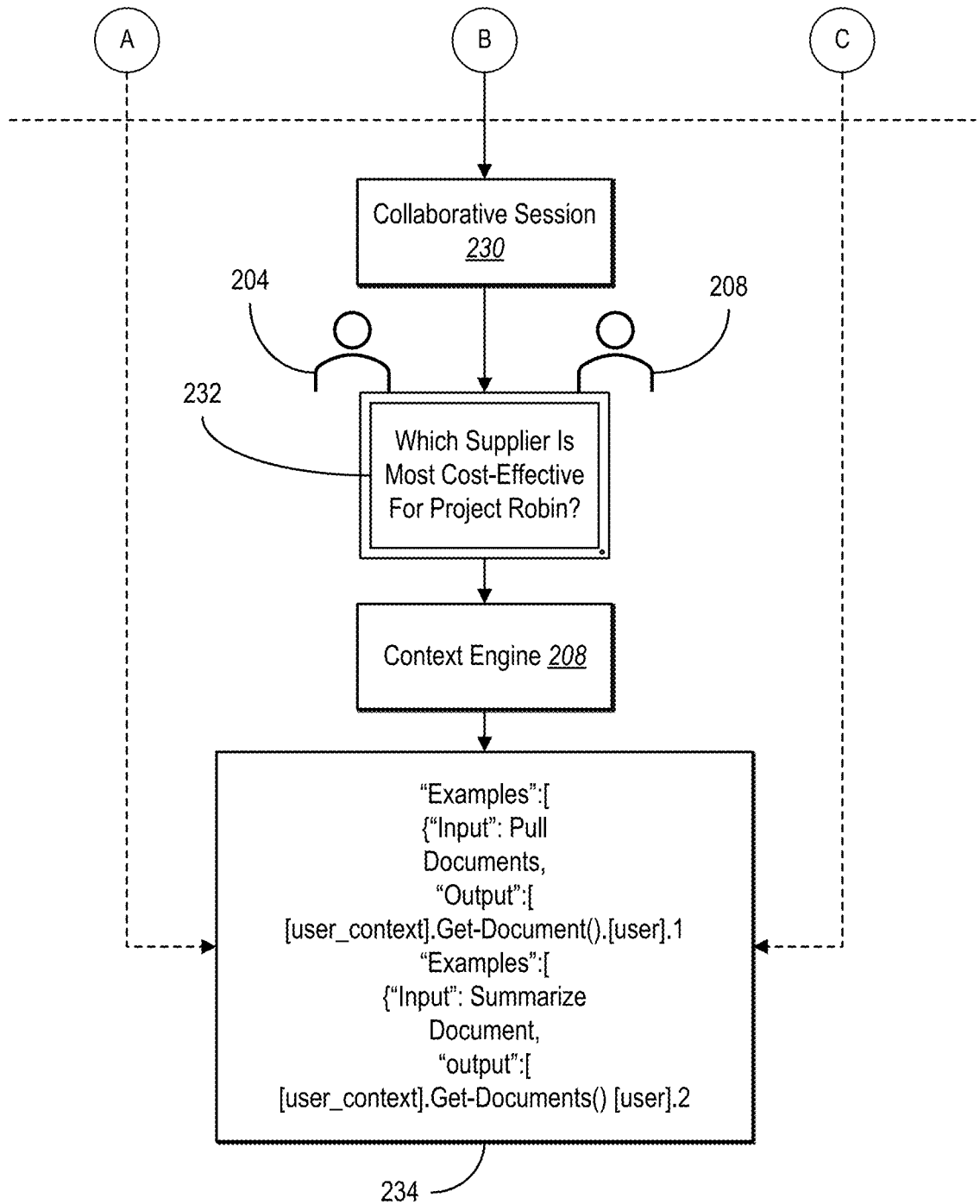

As mentioned above, the collaborative interpreter system 100 can generate a merged prompt by pulling in one or more queries, prompts, and/or results from previous sessions (or instances) of one or more collaborating user accounts with a large language model. FIGS. 2A-2B illustrate the collaborative interpreter system 100 generating a merged prompt in accordance with one or more embodiments. In particular, FIG. 2A illustrates the collaborative interpreter system 100 generating and storing one or more queries, prompts, computer codes, and/or responses for individual sessions of collaborating user accounts with a large language model in accordance with one or more embodiments.

For example, FIG. 2A shows the collaborative interpreter system 100 receiving a first query 202 from a first client device (e.g., via an interface for interacting with a large language model 214). As shown, the first query 202 in FIG. 2A reads, "Pull Project Robin overview." In one or more embodiments, the collaborative interpreter system 100 can receive the first query 202 from a first client device associated with a first collaborating user account 204 during an individual session (or first instance) with a large language model 214. As shown in FIG. 2A, the collaborative interpreter system 100 can process (or analyze) the first query 202 with a context engine 209 to generate a first prompt 210.

In one or more embodiments, the first prompt 210 can include one or more example functions related to the content, topic, theme, and/or task within the first query 202. For example, as shown in FIG. 2A, the first prompt 210 can include one or more retrieval example functions for pulling one or more content items (e.g., documents, emails, and/or videos) related to the first query 202. In some cases, the one or more content items can be associated with the first collaborating user account 204, and the first prompt 210 can include one or more retrieval example functions for pulling one or more content items stored in a database associated with the first collaborating user account 204. In one or more interpretations, the collaborative interpreter system 100 utilizes the one or more functions as building blocks as described by Rajkumar Janakiraman in U.S. patent application Ser. No. 19/057,835, titled GENERATING RESPONSES USING A CONTEXT ENGINE COUPLED WITH A LOGIC ENGINE AND TIME PHRASE RESOLUTION, filed on Feb. 19, 2025, which is hereby incorporated by reference in its entirety. In one or more implementations, the collaborative interpreter system 100 can communicate with a third-party application through an API to provide one or more example functions to the context engine 209 to include in the first prompt 210. For example, the collaborative interpreter system 100 can pull in one or more example functions from one or more APIs communicating with the third-party application (e.g., Google Calendar) to schedule a meeting.

As shown in FIG. 2A, the collaborative interpreter system 100 can generate computer code 220 for execution by the interpreter 216. In some embodiments, the computer code 220 includes a set of instructions written in a programming language that a computing device or agent, such as, but not limited to, the interpreter 216 can interpret and execute to perform a specific task. In particular, the computer code 220 can include a series of statements and/or functions that execute specific operations. Further, the computer code 220 can include statements written in specific syntax and can be translatable into machine code to be executed by a computing device. In some cases, the collaborative interpreter system 100 can save the state (e.g., first state) of the interpreter 216 as the interpreter 216 executes the computer code 220. In particular, the collaborative interpreter system 100 can track which functions, parameters (or variables), data objects, etc., the interpreter 216 utilized or generated while executing the computer code 220. For example, the collaborative interpreter system 100 can track and save a scope stack and/or object map associated with the first state of the interpreter 216. In one or more cases, the collaborative interpreter system 100 can monitor, store, and/or manage the structured data of the first state of the interpreter 216.

As further shown in FIG. 2A, the collaborative interpreter system 100 can generate a first response 224 (or first result) for the first query 202 based, in part, on an output from the interpreter 216. In some cases, the collaborative interpreter system 100 can receive multiple queries from the first client device associated with the first collaborating user account 204 and generate prompts, computer code, and/or responses for each query (or multi-turn interaction) during an individual session with the large language model 214 and the interpreter 216. Additionally, the collaborative interpreter system 100 can generate one or more states of an agent (e.g., interpreter 216) during the individual session with the large language model 214. Accordingly, the collaborative interpreter system 100 can store the structured data of the one or more states of the agent and utilize the structured data to generate the merged state of the interpreter 216.

For example, the collaborative interpreter system 100 can generate a state of the large language model 214 for each turn within a multi-turn conversation with the large language model 214 and the interpreter 216. As shown in FIG. 2A, the collaborative interpreter system 100 can store the one or more states of the interpreter 216 in a database 228. For example, the collaborative interpreter system 100 can store one or more variables, parameters, functions, computer code, executed computer code, prompts, and/or responses associated with the individual session with the large language model 214 and the interpreter 216 in the database 228 associated with a content management system. In some cases, the collaborative interpreter system 100 can serialize the first state (and/or additional states) of the interpreter 216 before storing them in the database 228.

As shown in FIG. 2A, the collaborative interpreter system 100 can detect a second session of a second collaborating user account 208 with the large language model 214 and agent (e.g., interpreter 216). As described above, the collaborative interpreter system 100 can receive a second query 206 reading "Summarize deadlines for project Robin" from a second client device associated with the second collaborating user account 208. As described above, the collaborative interpreter system 100 can analyze the second query 206 with the context engine 209 to generate a second prompt 212 comprising one or more additional example functions related to the topic, theme, and/or task associated with the second query 206. For example, as shown in FIG. 2A, the collaborative interpreter system 100 can include a summarization example function for summarizing deadlines for Project Robin from one or more content items associated with the second collaborating user account 208.

As shown in FIG. 2A, the collaborative interpreter system 100 can provide the second prompt 212 to the large language model 214 to generate additional computer code 222 for execution by the interpreter 216. As FIG. 2A illustrates, the collaborative interpreter system 100 can generate a second response 226 reading "Deadlines: Oct. 1 select developer" to the second query 206.

Relatedly, in some cases, the collaborative interpreter system 100 can determine a second state of the interpreter 216 for the second session of the large language model 214 with the second collaborating user account 208. Accordingly, in one or more implementations, during a multi-turn conversation, the collaborative interpreter system 100 can determine one or more states of the interpreter 216 for the second session of the large language model 214 and the interpreter 216 with the second collaborating user account 208. Indeed, the collaborative interpreter system 100 can track one or more queries, variables, parameters, prompts, results, responses, outputs, etc., received, generated, and/or utilized during a multi-turn conversation of the second session of the large language model 214 and the interpreter 216. As described above, the collaborative interpreter system 100 can serialize and/or store the second state of the interpreter 216 in the database 228.

As just described, the collaborative interpreter system 100 can track and/or store one or more queries, prompts, responses, variables, parameters, etc., of one or more different or individual sessions of a large language model with various collaborating user accounts. FIG. 2B illustrates the collaborative interpreter system 100 generating a merged prompt from the first query and second query in accordance with one or more embodiments. In particular, FIB. 2B shows the collaborative interpreter system 100 combining a first prompt and second prompt to generate the merged prompt.

As shown in FIG. 2B, the collaborative interpreter system 100 can detect a collaborative session 230 with the large language model 214 and the interpreter 216. In one or more cases, a collaborative session with the large language model 214 can comprise combining and/or merging one or more components of individual sessions of the large language model 214. In some implementations, the collaborative session can combine individual sessions (or workflows) from a single collaborating user account or individual sessions from a plurality of collaborating user accounts. In some cases, the collaborative interpreter system 100 can detect a collaborative session by receiving an indication of a selection of a collaborative session element from a collaborating user account (e.g., first collaborating user account 204) that is part of the plurality of collaborating user accounts. In some cases, the collaborative interpreter system 100 can detect the presence of the plurality of collaborating user account within a single (e.g., collaborative) session of the large language model 214.

As shown in FIG. 2B, once the collaborative interpreter system 100 detects the collaborative session 230, the 100 can receive a third query 232 reading "Which supplier is most cost-effective for Project Robin?" from either the first client device associated with the first collaborating user account 204 or the second client device associated with the second collaborating user account 208. In some implementations, the collaborative interpreter system 100 can receive an additional query (e.g., third query 232) from any of the plurality of client devices associated with the plurality of collaborating user accounts.

As shown in FIG. 2B, the context engine 209 can analyze the third query 232 and generate a merged prompt 234. In particular, the collaborative interpreter system 100 can access the first query 202, the second query 206, the first prompt 210, the second prompt 212, computer code 220 generated and/or executed from the first prompt 210, additional computer code 222 generated from the second prompt 212, the first response 224, and/or the second response 226. In one or more cases, the collaborative interpreter system 100 can pull in information, such as, example functions, variables, parameters, results, etc., from the first query 202, the second query 206, the first prompt 210, the second prompt 212, computer code 220 generated and/or executed from the first prompt 210, additional computer code 222 generated from the second prompt 212, the first response 224, and/or the second response 226 and combine the pulled data into the merged prompt 234. Indeed, in one or more embodiments, the merged prompt 234 can reflect the historical context of the first session and the second session of the large language model 214 and/or the interpreter 216.

As mentioned above, in some instances, the collaborative interpreter system 100 can combine the information from the first session of the large language model 214 and the second session of the large language model 214 according to a context window algorithm. In some cases, the context window algorithm can be based on semantic similarity, time relationships, visual similarity, and/or relationships among the plurality of collaborating user accounts. For example, the collaborative interpreter system 100 can combine variables, parameters, and/or example functions from the first turn (e.g., first interactions) of individual sessions of the large language model 214.

To further illustrate, as shown in FIG. 2B, the collaborative interpreter system 100 can combine and include the example functions of the first prompt 210 of the first session of the large language model 214 and the second prompt 212 of the second session of the large language model 214 in the merged prompt 234. Indeed, the collaborative interpreter system 100 can select and/or pull one or more example functions from one or more prompts generated during individual sessions of the large language model 214 to generate the merged prompt 234 that, in turn, can inform (or generate) a response or a result to the third query 232. As described in more detail below in FIG. 4, the collaborative interpreter system 100 can generate from the merged prompt 234 a merged state of the agent (e.g., interpreter 216) that combines a first state of the interpreter 216 associated with the first session of the large language model 214 and a second state of the interpreter 216 associated with the second session of the large language model 214 and/or the interpreter 216.

Figure 3:
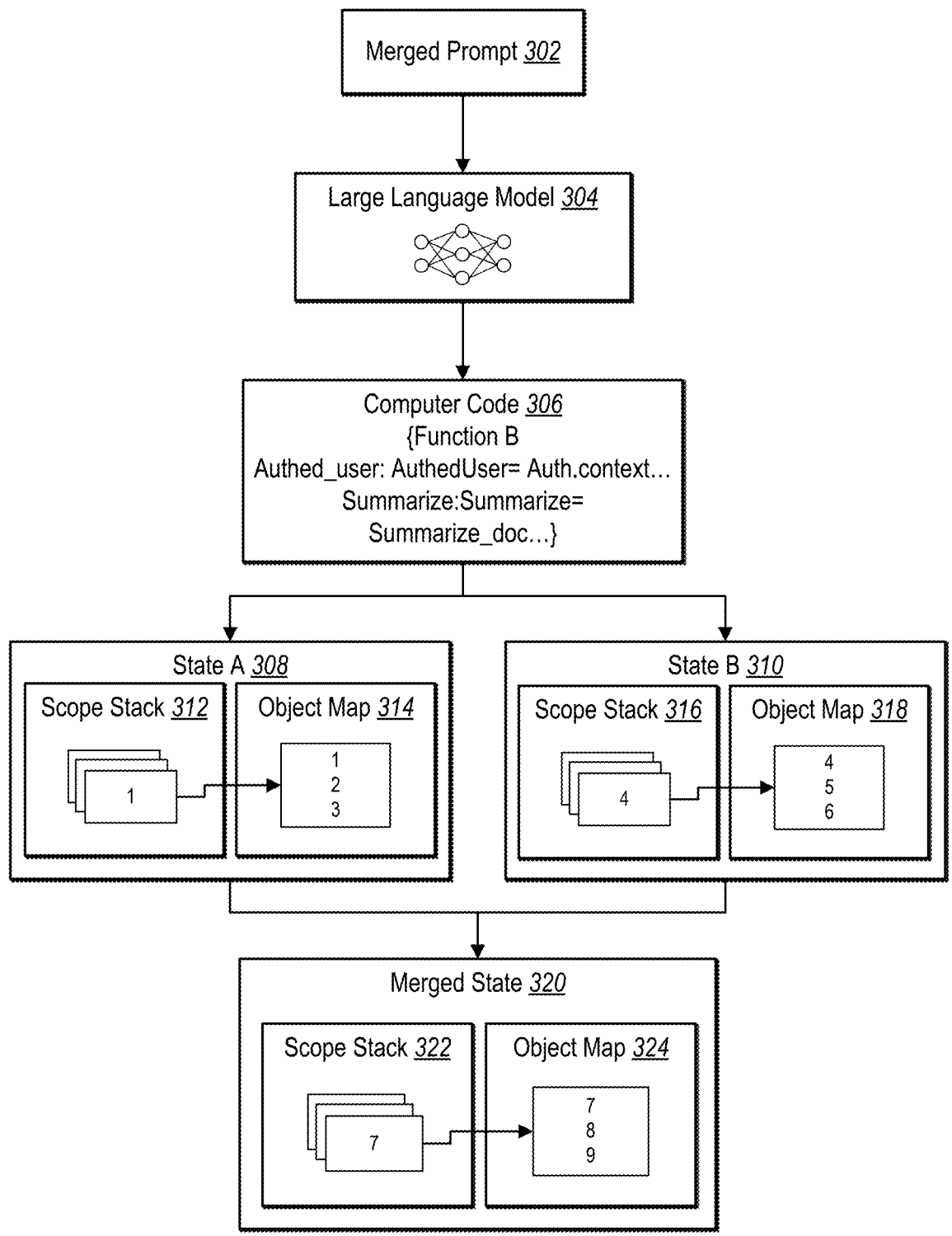
FIG. 3 illustrates the collaborative interpreter system generating a merged state of an agent in accordance with one or more embodiments.

In some cases, the collaborative interpreter system 100 can utilize the merged prompt to generate a merged state of an agent (e.g., interpreter) working with a large language model to perform one or more tasks. FIG. 3 illustrates the collaborative interpreter system 100 generating a merged state of an agent in accordance with one or more embodiments.

As shown in FIG. 3, the collaborative interpreter system 100 can generate a merged prompt 302 that reflects information from individual sessions of a large language model and/or agent, such as an interpreter. As further shown in FIG. 3, the collaborative interpreter system 100 can generate computer code 306 by providing the merged prompt 302 to a large language model 304. As described above, the large language model 304 can generate computer code 306 based on the instructions in the merged prompt 302. In particular, the computer code 306 can include one or more functions, variables, parameters, etc., from executed computer code executed by the agent (e.g., interpreter). In some cases, the collaborative interpreter system 100 can pull the actual data (e.g., prior states of the agent) related to the one or more functions, variables, parameters, etc., and construct the merged state 320 of the agent (e.g., interpreter).

As just mentioned, the collaborative interpreter system 100 can generate a merged state 320 for the interpreter. In some cases, the collaborative interpreter system 100 can pull prior states of the interpreter from different sessions of the large language model 304 and/or interpreter. For example, as shown in FIG. 3, the collaborative interpreter system 100 can pull a first state (e.g., state A 308) of the interpreter associated with a first individual session of the large language model 304. In some cases, the state A 308 of the interpreter can include a first scope stack 312 and a first object map 314. In one or more implementations, the first scope stack 312 can reflect various levels (e.g., local, global, etc.) within executed computer code processed by the interpreter during the first individual session. Additionally, the first object map 314 can include identifiers corresponding to objects or values of one or more variables, functions, and/or parameters within the executed computer code of the first individual session.

As further shown in FIG. 3, the collaborative interpreter system 100 can pull a second state (e.g., state B 310) of the interpreter associated with a second individual session of the large language model 304 and/or the interpreter. In one or more embodiments, the state B can include a second scope stack 316 and a second object map 318 of the interpreter. The second scope stack 316 can represent various levels of scope (or context) in the computer code 306, and the second object map 318 can track identifiers corresponding to objects and/or values associated with one or more variables, parameters, and/or functions within the executed computer code associated with the second individual session.

Accordingly, in some cases, the computer code 306 can reflect one or more prior states of the agent (e.g., interpreter) by pulling in variables, objects, identifiers, functions, and/or parameters associated with the state A 308 and the state B 310. As shown in FIG. 3, in some cases, the collaborative interpreter system 100 can generate the merged state 320 of the agent (e.g., interpreter) by merging one or more segments (or subsegments) of the state A 308 and the state B 310. For example, the collaborative interpreter system 100 can build the merged state 320 by generating a merged scope stack 322 and a merged object map 324. For example, the collaborative interpreter system 100 can create the merged scope stack 322 by combining the first scope stack 312 with the second scope stack 316. Likewise, in some cases, the collaborative interpreter system 100 can generate the merged object map 324 by combining the first object map 314 with the second object map 318. As indicated above, the collaborative interpreter system 100 can combine any number of states of one or more agents (e.g., interpreters) associated with one or more sessions of a large language model and/or agent to generate the merged state 320. In some cases, the collaborative interpreter system 100 can combine the structured data associated with the state A 308 with the structured data associated with the state B 310 of the interpreter to generate the merged state 320 of the interpreter.

Additionally, in one or more embodiments, the collaborative interpreter system 100 can manage and/or update the merged state 320 of the interpreter. As indicated above, the collaborative interpreter system 100 can track, monitor, and/or store relationships among one or more collaborating user accounts, queries, individual sessions, collaborative sessions, responses, and/or content items related to the merged state 320 of the agent (e.g., interpreter). In some cases, the collaborative interpreter system 100 can generate an interpreter state map that represents the one or more relationships among one or more collaborating user accounts, queries, prompts, computer codes, individual sessions, collaborative sessions, responses, and/or content items related to the merged state 320 of the interpreter. For example, the collaborative interpreter system 100 can show which variables from which content items used in individual sessions feed into one or more variables within the computer code executed by the interpreter during the collaborative session. As another example, in some cases, the interpreter map can show relationships between the plurality of collaborating user accounts. For instance, the interpreter map can show that a first collaborating user account and a second collaborating user account are within the same department of an organization.

In some embodiments, the structure of the data of the merged state 320 of the interpreter can be akin to a tree data structure comprising one or more nodes connected by edges. In one or more implementations, each node can represent a raw value (e.g., number, string, Boolean, etc.) of a variable, parameter, function, object, and/or collaborating user account associated with the merged state 320 of the interpreter. In one or more cases, the tree data structure of the merged state 320 of the interpreter can be non-linear, where the collaborative interpreter system 100 can branch off and generate additional merged states (or individual states) of the interpreter from the merged state 320 of the interpreter.

In some cases, the collaborative interpreter system 100 can manage the data within the interpreter state map. In one or more implementations, the collaborative interpreter system 100 manages the data within the interpreter state map by modifying and/or updating the nodes (e.g., variables) associated with the merged state 320 of the interpreter. For example, the collaborative interpreter system 100 can generate an initial merged state of the interpreter by executing computer code with the interpreter to generate a response to an initial query in a collaborative session with the large language model.

In one or more cases, as described above, the initial merged state can include one or more values for one or more variables or parameters within the executed computer code. In some cases, the collaborative interpreter system 100 can fetch fresh data (e.g., one or more new and/or updated values for the one or more variables or parameters) and generate modified computer code by replacing the one or more initial values of the one or more variables and/or parameters with the one or more new values. In one or more cases, the collaborative interpreter system 100 can execute the modified computer code with the interpreter and generate an updated merged state of the interpreter comprising the one or more new values for the one or more variables and/or parameters executed in the computer code. In some cases, the collaborative interpreter system 100 can update the interpreter state map by replacing the initial merged state of the interpreter with the updated state of the interpreter.

Indeed, the collaborative interpreter system 100 can automatically update one or more nodes within the interpreter state map. For example, in some instances, the collaborative interpreter system 100 can update a node every hour and generate an updated merged state of the interpreter. In one or more implementations, the collaborative interpreter system 100 can update each node individually. For example, the collaborative interpreter system 100 can manage one or more nodes by updating a first node on an hourly basis and leaving the remaining nodes untouched. In some cases, the collaborative interpreter system 100 can receive one or more user interactions directing how often the collaborative interpreter system 100 should update the node (or the merged interpreter state). Alternatively, in some embodiments, the collaborative interpreter system 100 can receive one or more user interactions manually updating (or replacing) one or more values of one or more nodes associated with the merged state 320 of the interpreter. As discussed in more detail below in FIG. 7, the collaborative interpreter system 100 can generate a visualization of the interpreter state map.

In some cases, the collaborative interpreter system 100 can generate and/or manage an entity-wide (or group-wide or team-wide) state of the interpreter. For example, an entity-wide state of the interpreter can merge individual states of sessions of members of the entity to reflect the variables, parameters, prompts, responses, etc., generated by members and/or groups within the entity. In one or more embodiments, the collaborative interpreter system 100 can update portions (or nodes) of the entity-wide state. For example, the collaborative interpreter system 100 can update a branch of the data structure corresponding to the entity-wide state while leaving the other branches unchanged. For example, the collaborative interpreter system 100 can update the emails of an entity-wide contact list without modifying the names of the members on the contact list. Indeed, the collaborative interpreter system 100 can manage, modify, and/or update one or more nodes, branches, and/or the entire data structure of the entity-wide state on an individual, granular basis.

Figure 4:
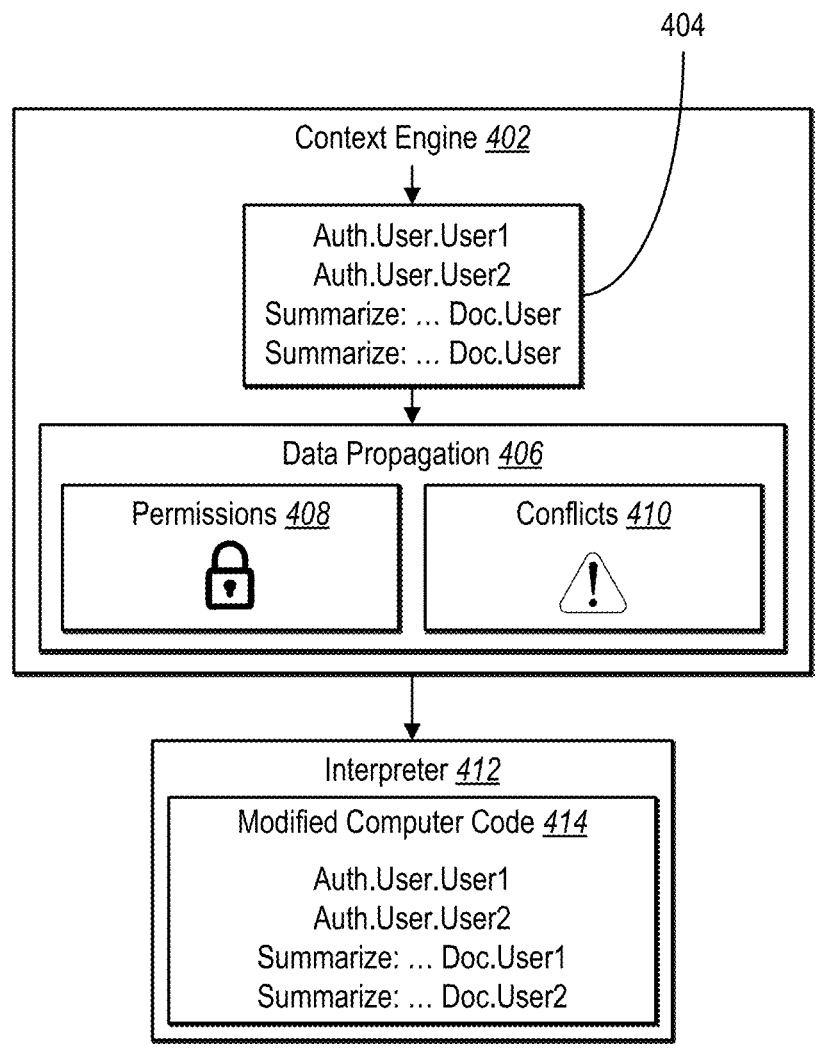
FIG. 4 illustrates a collaborative interpreter system addressing permission issues, security concerns, conflicting data, and/or overlapping data in accordance with one or more embodiments.

As mentioned above, the collaborative interpreter system 100 can generate a merged prompt according to a context window algorithm that combines the contexts (e.g., historical contexts) of individual sessions (or instances) of a large language model and/or agent. Moreover, the collaborative interpreter system 100 can generate a merged state of an agent (e.g., interpreter) based on the merged prompt. In one or more embodiments, the collaborative interpreter system 100 can encounter privacy issues, security concerns, conflicting data, and/or overlapping data (e.g., variables, objects, parameters, etc.) when combining sessions of a large language model and/or states of the agent. FIG. 4 illustrates the collaborative interpreter system 100 addressing permission issues and/or conflicting data within computer code in accordance with one or more embodiments.

As discussed above, the collaborative interpreter system 100 can generate a merged state that combines one or more states of an interpreter 412 associated with individual sessions of a large language model. In some cases, before runtime (or executing) the computer code 404 associated with the merged state with the interpreter 412, the collaborative interpreter system 100 can resolve one or more permissions 408, and/or one or more conflicts 410 for one or more parameters, variables, objects, and/or functions within the computer code 404 through data propagation 406 (or type propagation). In particular, the collaborative interpreter system 100 can run one or more analysis passes on the computer code 404 with the context engine 402.

As just mentioned, the collaborative interpreter system 100 can identify one or more permissions 408 associated with one or more source content items included in the computer code 404 based on the merged prompt. For example, during a collaborative session, the collaborative interpreter system 100 can determine that a subset of collaborating user accounts from the plurality of collaborating user accounts do not have the same access to one or more content items based on the one or more permissions 408 regarding privacy and/or security. In such instances, if the computer code 404 includes information (e.g., variables) and/or data from a source content item with limited access to a subset of collaborating user accounts, the collaborative interpreter system 100 can request permission to share the information from the source content item from the collaborating user account with access to the source content item.

For example, a first collaborating user account can grant access to secure data to a second collaborating user account that does not have access. In some cases, due to the structure of the merged state of the interpreter 412, the collaborative interpreter system 100 can grant permission to one or more functions, variables, parameters, objects, etc., on a granular level. For instance, the collaborative interpreter system 100 can request from the first collaborating user account permission to include a specific value of a variable within the computer code 404 to generate a response that the second collaborating user account can access.

Additionally, the collaborative interpreter system 100 can receive and/or determine one or more privacy and/or security settings associated with one or more content items. For example, the collaborative interpreter system 100 can receive one or more indications from a client device associated with a first collaborating user account granting the second collaborating user account access to a subset of documents within a file. In one or more embodiments, based on the permissions, the collaborative interpreter system 100 can include the accessible data (e.g., one or more variables, values, and/or parameters) in the computer code 404 to generate a response for the plurality of collaborating user accounts.

In some embodiments, the collaborative interpreter system 100 can remove the secure and/or private data from the computer code and not include the secured data while generating the response during the collaborative session. Indeed, the collaborative interpreter system 100 can generate computer code 404 that follows the permissions granted by each collaborating user account within the plurality of collaborating user accounts. For example, in some cases, during the collaborative session, the collaborative interpreter system 100 can generate for a query a first response for the first collaborating user account that differs from a second response generated for the second collaborating user account.

Additionally, in one or more cases, the collaborative interpreter system 100 can detect one or more conflicts (or overlaps) 410 between functions, variables, parameters, objects, etc., within the computer code 404 prior to runtime of the computer code 404. For example, during a first individual session of a first collaborating user account with the large language model and/or the interpreter 412, the collaborative interpreter system 100 can execute a function with a first parameter while generating a first response to a first query. Additionally, during a second individual session of a second collaborating user account with the large language model and/or the interpreter 412, the collaborative interpreter system 100 can execute the function with a second parameter while generating a second response to the second query. In some cases, the name (or value) of the first parameter can conflict, match, and/or overlap with the name (or value) of the second parameter, and such a conflict can lead to logic errors and bugs within the computer code.

Accordingly, during the collaborative session with the first collaborating user account and the second collaborating user account, the collaborative interpreter system 100 can detect the conflict between the first parameter and the second parameter while analyzing the computer code 404 associated with the merged state from the first individual session and the second individual session. In some cases, the collaborative interpreter system 100 can generate modified computer code 414 by modifying the first parameter and the second parameter. In particular, the collaborative interpreter system 100 can rename or apply a first collaborator namespace the first parameter to be associated with the first collaborating user account and a second collaborator namespace to the second parameter to be associated with the second collaborating user account. By namespacing the parameters, functions, values, etc., of the computer code 404, the collaborative interpreter system 100 can avoid collisions (or the one or more conflicts 410) and organize the computer code in a structural manner.

In some embodiments, the collaborative interpreter system 100 can utilize object composition or encapsulation to remove one or more conflicts 410 from the computer code 404. Additionally, in one or more embodiments, the collaborative interpreter system 100 can execute the modified computer code 414 on the interpreter to generate a response. In some cases, based on the namespacing in the modified computer code 414, the collaborative interpreter system 100 can update the one or more example functions in the merged prompt to include namespacing. Indeed, the collaborative interpreter system 100 can namespace one or more parameters, functions, variables, objects, values, and/or identifiers associated with individual collaborating user accounts and individual sessions with the large language model and/or states of the interpreter to avoid logic errors and bugs within the computer code 404.

In some cases, the collaborative interpreter system 100 can deal with overlapping parameters by merging the values of the one or more parameters from the merged state. For example, the collaborative interpreter system 100 can determine that the first value associated with the first parameter matches the second value associated with the second parameter. Based on the first value of the first parameter matching the second value of the second parameter, the collaborative interpreter system 100 can combine the first value and the second value in the merged state and include the combined value in the computer code 404.

Figure 5:
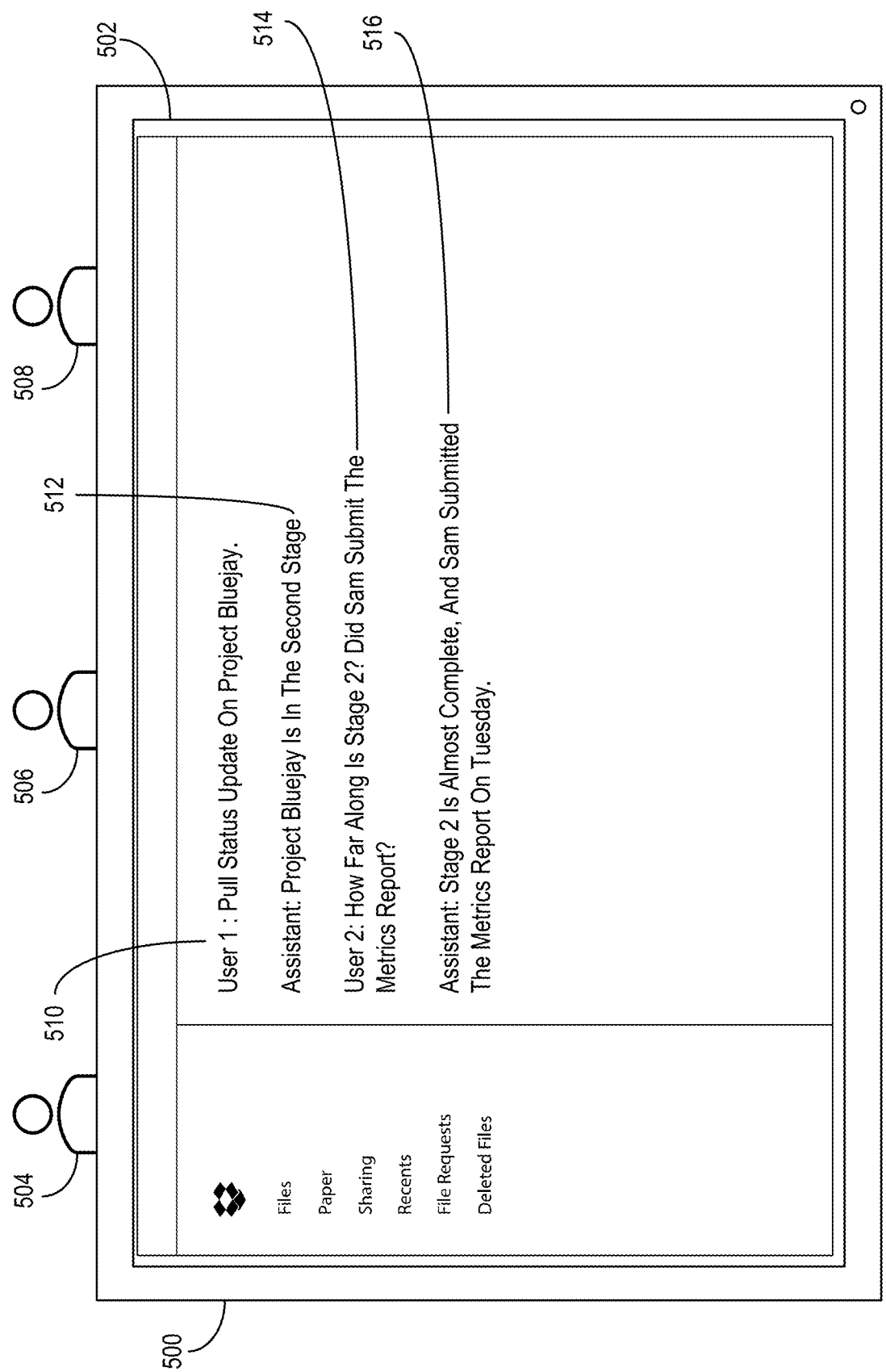
FIG. 5 illustrates an exemplary graphical user interface of a synchronous collaborative session with a large language model in accordance with one or more embodiments.

As described above, the collaborative interpreter system 100 can generate a merged prompt and merged state of an agent (e.g., interpreter) to implement a collaborative session with a large language model that brings in relevant context from individual sessions with the large language model. In some cases, the collaborative interpreter system 100 can detect a collaborative session where the plurality of collaborating user accounts interact with the large language model synchronously and/or asynchronously. FIG. 5 illustrates an exemplary graphical user interface of a synchronous collaborative session with a large language model in accordance with one or more embodiments.

As shown in FIG. 5, the collaborative interpreter system 100 can detect a collaborative session with a large language model where a plurality of collaborating user accounts comprising a first collaborating user account 504, a second collaborating user account 506, and a third collaborating user account 508. As shown in FIG. 5, the collaborative interpreter system 100 can receive a first query 510 reading "Pull status update on project Bluejay" from the first collaborating user account 504. In one or more cases, during a synchronous collaborative session, the collaborative interpreter system 100 can provide for display on one or more graphical user interfaces (represented by the collaborative graphical user interface 502) of one or more client devices (represented as client device 500) associated with the plurality of user accounts, the first query 510. Accordingly, as shown in FIG. 5, the collaborative interpreter system 100 can generate a first response 512 reading "Project Bluejay is in the second stage" to the first query 510. As described above, the collaborative interpreter system 100 can provide for display the first response 512 on a first client device associated with the first collaborating user account 504, a second client device associated with the second collaborating user account 506, and a third client device associated with the third collaborating user account 508.

As described above, in one or more embodiments, the first collaborating user account 504, the second collaborating user account 506, and/or the third collaborating user account 508 can interact with individual sessions of the large language model. As previously discussed, the collaborative interpreter system 100 can combine the one or more individual sessions into a collaborative session according to a context window algorithm to generate a contextually aware response to the first query 510.

FIG. 5 further shows the collaborative interpreter system 100 receiving a second query 514 reading, "How far along is stage 2? Did Same submit the metrics report?" from the second collaborating user account 506. In one or more embodiments, the collaborative interpreter system 100 can pull information from individual sessions of the first collaborating user account 504, the second collaborating user account 506, and/or the third collaborating user account 508 to generate a second response 516 reading, "Stage 2 is almost complete, and Sam submitted the metrics report on Tuesday." The synchronous collaboration between the plurality of collaborating user accounts allows the collaborative interpreter system 100 to meld divide-and-conquer workflows to generate relevant and context-aware responses.

In some cases, within a collaborative graphical user interface 502, the collaborative interpreter system 100 can receive a message from a first client device associated with the first collaborating user account 504 that is directed to the third collaborating user account 508 and not the large language model and/or agent (e.g., interpreter). In such cases, the collaborative interpreter system 100 can determine that the message is not directed to the large language model and will not generate a prompt, computer code, and/or state of the agent based on receiving the message. For example, in some cases, the collaborative interpreter system 100 can identify an indicator, such as two slashes appended to the message, and determine that the message is directed to the second collaborating user account 506.

Figure 6:
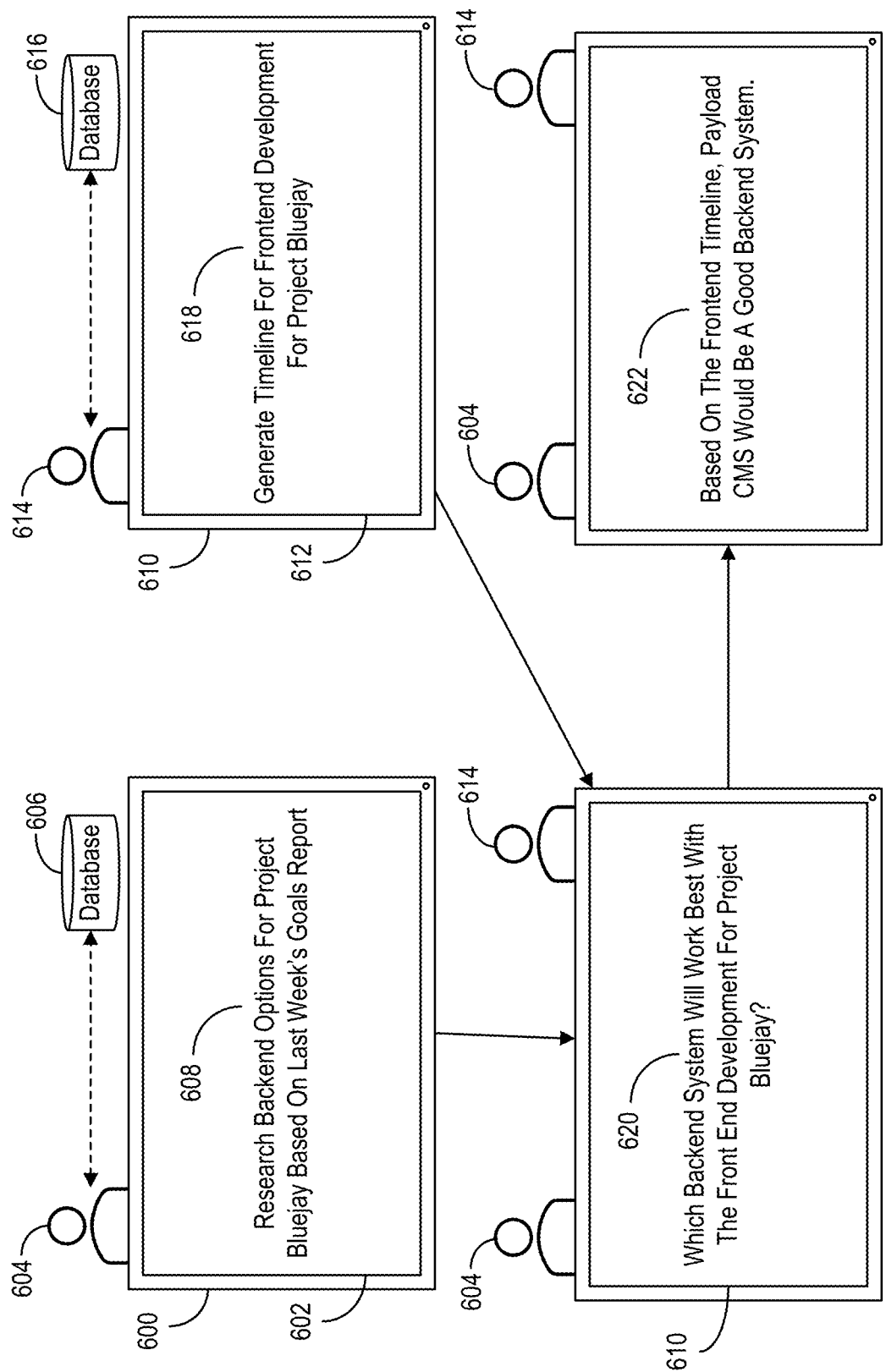
FIG. 6 illustrates an example diagram of the multi-turn interpreter system pausing and executing computer code for different user interaction contexts in accordance with one or more embodiments.

As just discussed, the collaborative interpreter system 100 can facilitate a synchronous collaborative session for a plurality of collaborating user accounts. In one or more embodiments, the collaborative interpreter system 100 can facilitate an asynchronous collaborative session for the plurality of collaborating user accounts. FIG. 6 illustrates an exemplary graphical user interface of a state interpreter map in accordance with one or more embodiments.

As shown in FIG. 6, during a first individual session of a first collaborating user account 604 with a large language model, the collaborative interpreter system 100 can receive and provide for display on a first graphical user interface 602 a first query 608 reading "Research backend options for project Bluejay based on last week's goals report" from a first client device 600 associated with the first collaborating user account 604. As discussed above, the context engine can store and/or have access to one or more content items stored on a first database 606 associated with the first collaborating user account 604. As previously described, the collaborative interpreter system 100 can save the first query 608 along with a first prompt, computer code, a first state of an agent (e.g., interpreter), and/or a first response to the first query 608.

As further shown in FIG. 6, the collaborative interpreter system 100 can receive during a second individual session of a second collaborating user account 614 with the large language model, a second query 618 reading "Generate timeline for frontend development for Project Bluejay" as shown on a second graphical user interface 612 from a second client device 610 associated with the second collaborating user account 614. As described above, the collaborative interpreter system 100 and/or the context engine can access a second database 616 associated with the second collaborating user account 614 to generate a second response to the second query 618.

As shown in FIG. 6, the collaborative interpreter system 100 can detect an asynchronous collaborative session. In particular, the collaborative interpreter system 100 can receive an indication of a collaborative session among a plurality of collaborating user accounts (e.g., between the first collaborating user account 604 and the second collaborating user account 614). For example, the collaborative interpreter system 100 can receive permissions from the first collaborating user account 604 and the second collaborating user account 614 to start a collaborative session.

As FIG. 6 indicates, the collaborative interpreter system 100 can receive a third (or additional) query 620 reading "Which backend system will work best with the front-end development for Project Bluejay?" from the second client device 610 associated with the second collaborating user account 614 during the asynchronous collaborative session. As FIG. 6 shows, during the asynchronous collaborative session, the collaborative interpreter system 100 can receive a third query 620 from the second client device 610 associated with the second collaborating user account 614 while the first collaborating user account 604 is not concurrently interacting with the collaborative session of the large language model and/or the agent (e.g., interpreter). Indeed, the first collaborating user account 604 and/or the second collaborating user account 614 can interact with the collaborative session of the large language model at any time without the other collaborating user account. For example, as shown in FIG. 6, the collaborative interpreter system 100 can generate a response 622 to the third query reading, "Based on the front-end timeline, payload CMS would be a good backend system."

As FIG. 6 shows, the collaborative interpreter system 100 can generate the response based, at least in part, on the first query 608, the response to the first query, the second query 618, and the response to the second query in individual and/or separate session with the large language model. Indeed, the collaborative interpreter system 100 can track the historical context of the individual sessions and the asynchronous collaborative session of the first collaborating user account 604 and the second collaborating user account 614 with the large language model and/or so that the collaborative interpreter system 100 can generate relevant and context-aware responses to queries from the plurality of collaborating user accounts.

In some cases, the collaborative interpreter system 100 can detect a termination of the collaborative session of the large language model. In some cases, based on the termination, the collaborative interpreter system 100 can serialize and/or save the merged state of the interpreter in a database. Accordingly, in one or more embodiments, the collaborative interpreter system 100 can detect a new instantiation of the collaborative session from the first collaborating user account 604 and/or the second collaborating user account 614 (or the plurality of collaborating user accounts) and resume the merged state of the interpreter. In some cases, the collaborative interpreter system 100 can detect the new instantiation of the collaborative session by detecting the plurality of collaborating user accounts synchronously interacting with the large language model. In one or more embodiments, the collaborative interpreter system 100 can detect a selection from the first collaborating user account 604 and/or the second collaborating user account 614 of the merged state of the interpreter to resume the collaborative session of the large language model.

Figure 7:
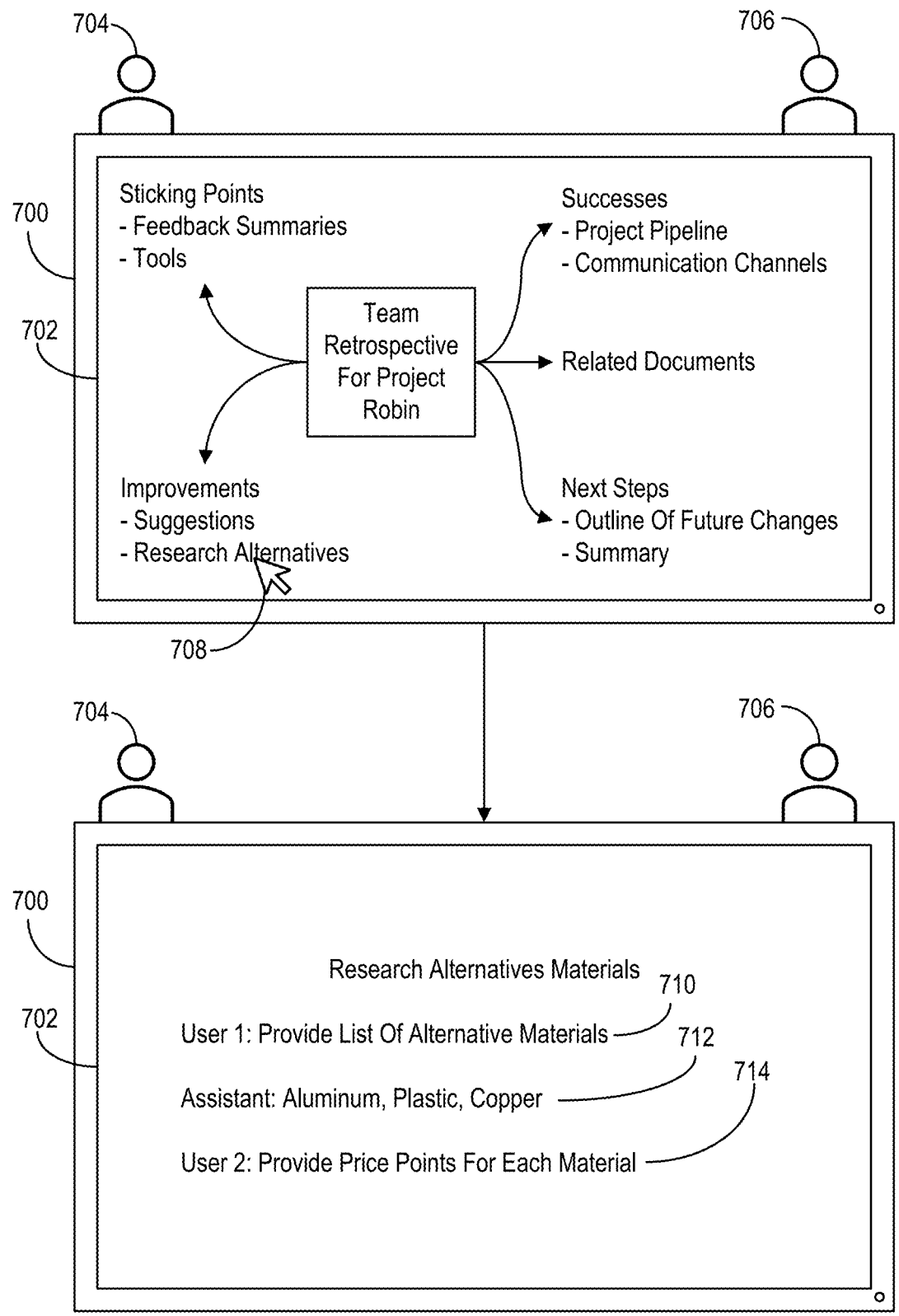
FIG. 7 illustrates an exemplary graphical user interface of a state interpreter map in accordance with one or more embodiments.

As discussed, the collaborative interpreter system 100 can provide graphical user interfaces for asynchronous and synchronous collaborative sessions with the large language model and/or the agent (e.g., interpreter). As discussed above, the collaborative interpreter system 100 can generate a state interpreter map reflecting one or more relationships between individual states and/or merged states of an interpreter. In some cases, the collaborative interpreter system 100 can generate a visualization of the state interpreter map. FIG. 7 illustrates an exemplary graphical user interface of a state interpreter map in accordance with one or more embodiments.

As shown in FIG. 7, during a collaborative session between a first collaborating user account 704 and a second collaborating user account 706, the collaborative interpreter system 100 can provide for display on a graphical user interface 702 of a client device 700 a state interpreter map for a team retrospective for Project Robin. As shown in FIG. 7, the state interpreter map can have one or more sections related to sticking points, improvements, successes, related documents, and next steps. In one or more embodiments, the collaborative interpreter system 100 can receive one or more user interactions selecting, reviewing, and/or editing the one or more sections of the state interpreter map. For example, as shown in FIG. 7, the collaborative interpreter system 100 can receive an indication of a selection 708 of "research alternatives" under the improvements section of the interpreter state map. As shown in FIG. 7, the collaborative interpreter system 100 can update the graphical user interface 702 on the client device 700 to show a subsection of the state interpreter map related to research alternative materials.

As shown in FIG. 7, the collaborative interpreter system 100 can receive from the first collaborating user account 704 a first query 710 reading "Provide list of alternative materials." As described above, in one or more embodiments, the collaborative interpreter system 100 can pull from individual sessions of the large language model and states of the interpreter to generate a response 712 reading "Aluminum, plastic, and copper" to the first query 710. Moreover, as shown in FIG. 7, the collaborative interpreter system 100 can receive a second query 714 from the second collaborating user account 706 reading "Provide price points for each material." Indeed, the collaborative interpreter system 100 can generate a merged state of the interpreter for the subsection related to research alternative materials.

In some cases, the visualization of the interpreter state map can be a tree data structure showing the raw data (e.g., values, identifiers, etc.) associated with the merged state of the interpreter. For example, the visualization of the interpreter state map can start at an initial merged state associated with an initial collaborative session and branch out into one or more additional merged states of the interpreter associated with one or more additional collaborative sessions related to the initial collaborative session with the large language model.

In one or more embodiments, the collaborative interpreter system 100 can manage and/or modify the interpreter state map by utilizing a seed state of the interpreter. In some cases, the collaborative interpreter system 100 can generate a seed state of the interpreter based on an initial (or first) instance of a session with the large language model. In one or more embodiments, the collaborative interpreter system 100 can store the seed state of the interpreter with the original data (e.g., variables, parameters, prompts, etc.) and can roll over data associated with the seed state to a subsequent session (e.g., subsequent collaborative session) by recreating (or regenerating) variables of the seed state of the interpreter. For example, during an initial collaborative session of the large language model, the query could instruct the large language model to determine a price volume of 10 stocks by multiplying the price of the stocks by the volume of the stocks. As described above, the collaborative interpreter system 100 can generate a seed state of the interpreter associated with the initial collaborative session.

During a subsequent collaborative session with the large language model, the collaborative interpreter system 100 can regenerate the seed state of the interpreter with the data from the initial collaborative session. In some cases, the collaborative interpreter system 100 can update one or more nodes (or values of the nodes) that differ from the values of the one or more nodes of the seed state. For example, during a subsequent session, the collaborative interpreter system 100 can update the price volume of the stocks while keeping the volume of the stocks the same. In some instances, the collaborative interpreter system 100 can utilize the seed state of the interpreter for break-out (or branching) sessions of the large language model and/or interpreter.

Moreover, in one or more cases, the collaborative interpreter system 100 can detect or be aware of common topics, themes, and/or documents from one or more sub-groups of a plurality of collaborative user accounts associated with a collaborative session. For example, in some cases, the collaborative interpreter system 100 can generate break-out collaborative sessions for sub-groups from the plurality of collaborative user accounts. In such instances, the collaborative interpreter system 100 can detect common topics addressed, mentioned, or discussed within the break-out collaborative sessions and pull information of the common topic from a first sub-group collaborative session and include, add, and/or rely on it in a second sub-group collaborative session. Indeed, the collaborative interpreter system 100 can intelligently share related and/or relevant information from break-out groups to enable context aware response generation.

FIGS. 1-7, the corresponding text, and the examples provide a number of different systems and methods for generating a merged prompt. In addition to the foregoing, implementations can also be described in terms of flowcharts comprising acts/steps in a method for accomplishing a particular result. For example, FIG. 8 illustrates an example series of acts performed by the collaborative interpreter system in accordance with one or more embodiments.

Figure 8:
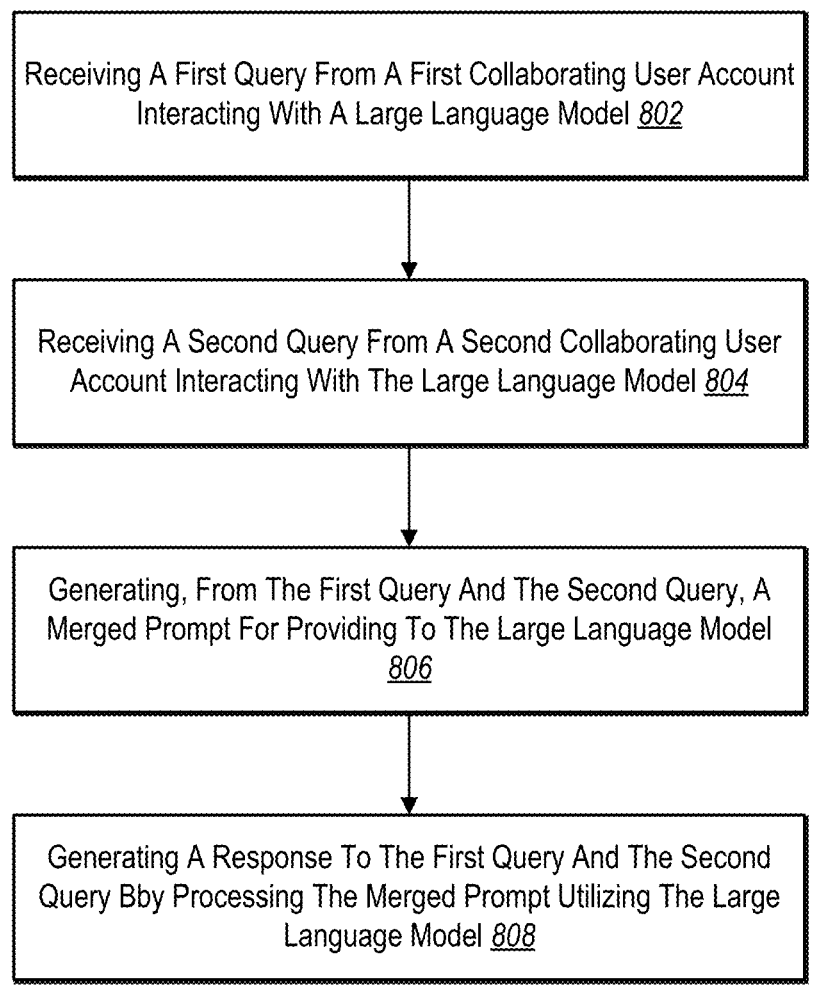
FIG. 8 illustrates an example series of acts performed by the collaborative interpreter system in accordance with one or more embodiments.

While FIG. 8 illustrates acts according to certain implementations, alternative implementations may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further implementations, a system can perform the acts of FIG. 8.

As illustrated in FIG. 8, a series of acts 800 may include an act 802 of receiving a first query from a first collaborating user account interacting with a large language model, an act 804 of receiving a second query from a second collaborating user account interacting with the large language model, an act 806 of generating, from the first query and the second query, a merged prompt for providing to the large language model, and an act 808 of generating a response to the first query and second query by processing the merged prompt utilizing the large language model.

In particular the act 802 includes receiving a first query from a first collaborating user account among a plurality of collaborating user accounts interacting with a large language model. Further, the act 804 includes receiving a second query from a second collaborating user account among the plurality of collaborating user accounts interacting with the large language model. Moreover, the act 806 includes generating, from the first query and the second query, a merged prompt for providing to the large language model. Additionally, the act 808 includes generating, by processing the merged prompt utilizing the large language model, a response for providing to the first collaborating user account and the second collaborating user account.

Further, in one or more embodiments, the series of acts 800 includes an act where generating the merged prompt comprises generating, utilizing a context engine associated with the large language model, a first prompt associated with the first query. Additionally, in one or more embodiments, the series of acts 800 includes generating, utilizing the context engine, a second prompt associated with the second query. In some cases, the series of acts 800 can include combining the first prompt and the second prompt.

Moreover, in one or more embodiments, the series of acts 800 includes determining, for an interpreter associated with the large language model, a first state of the interpreter responding to the first query from the first collaborating user account. Furthermore, in one or more embodiments, the series of acts 800 includes determining a second state of the interpreter responding to the second query from the second collaborating user account. Additionally, in one or more embodiments, the series of acts 800 includes generating a merged state of the interpreter by combining the first state of the interpreter with the second state of the interpreter according to structured data of the first state of the interpreter and the second state of the interpreter.

Moreover, in one or more embodiments, the series of acts 800 includes detecting, within the merged prompt, a conflict between a first parameter defined by the first query from the first collaborating user account and a second parameter defined by the second query from the second collaborating user account. Further, in one or more embodiments, the series of acts 800 includes modifying the merged prompt to resolve the conflict by applying a first collaborator namespace to the first parameter and a second collaborator namespace to the second parameter.

Moreover, in one or more embodiments, the series of acts 800 includes generating, for an interpreter associated with the large language model, a merged state of the interpreter for a collaborative session of the large language model, wherein the collaborative session comprises the plurality of collaborating user accounts synchronously interacting with the large language model. Further, in one or more embodiments, the series of acts 800 includes storing the merged state of the interpreter corresponding to the collaborative session based on detecting a termination of the collaborative session. In some cases, the series of acts 800 can include resuming the merged state of the interpreter based on detecting a new instantiation of the collaborative session of the plurality of collaborating user accounts synchronously interacting with the large language model.

Moreover, in one or more embodiments, the series of acts 800 includes an act where generating the merged prompt comprises determining one or more permissions associated with the first collaborating user account and the second collaborating user account for providing a context engine access to one or more content items associated with the first collaborating user account and the second collaborating user account.

Additionally, in one or more embodiments, the series of acts 800 includes generating, for an interpreter associated with the large language mode, a merged state to maintain a collaborative session of the plurality of collaborating user accounts interacting with the large language model by utilizing a context window algorithm to determine relationships between individual sessions of respective user accounts with the large language model.

Moreover, in one or more embodiments, the series of acts 800 includes receiving a first query from a first collaborating user account among a plurality of collaborating user accounts interacting with a large language model. Further, in one or more embodiments, the series of acts 800 includes receiving a second query from a second collaborating user account among the plurality of collaborating user accounts interacting with the large language model. Additionally, in one or more embodiments, the series of acts 800 includes generating, from the first query and the second query, a merged prompt for providing to the large language model utilizing a context engine associated with the large language model. Moreover, in one or more embodiments, the series of acts 800 includes generating, by utilizing an interpreter associated with the large language model, a response for providing to the first collaborating user account and the second collaborating user account.

Further, in one or more embodiments, the series of acts 800 includes generating the merged prompt by: generating, utilizing the context engine, a first prompt comprising one or more example functions for the first query. Further, in one or more embodiments, the series of acts 800 includes generating, utilizing the context engine, a second prompt comprising one or more additional example functions for the second query. Furthermore, in one or more embodiments, the series of acts 800 includes combining the one or more example functions of the first prompt with the one or more additional example functions of the second prompt.

Moreover, in one or more embodiments, the series of acts 800 includes determining a first state of the interpreter representing a first context for the first query from the first collaborating user account. Further, in one or more embodiments, the series of acts 800 includes determining a second state of the interpreter representing a second context for the second query from the second collaborating user account. Moreover, in one or more embodiments, the series of acts 800 includes generating a merged state of the interpreter by combining the first state of the interpreter with the second state of the interpreter based on the first context relating to the second context.

Moreover, in one or more embodiments, the series of acts 800 includes detecting an overlap between a first parameter associated with a first collaborating user account and a second parameter associated with the second collaborating user account within the merged state. Further, in one or more embodiments, the series of acts 800 includes modifying the merged state by merging the first parameter and the second parameter.

Further, in one or more embodiments, the series of acts 800 includes generating a merged state of an interpreter for a collaborative session of the large language model, wherein the collaborative session comprises the plurality of collaborating user accounts asynchronously interacting with the large language model. Moreover, in one or more embodiments, the series of acts 800 includes storing the merged state of the interpreter corresponding to the collaborative session, based on detecting a termination of the collaborative session. Moreover, in one or more embodiments, the series of acts 800 includes receiving a request to resume the collaborative session from the first collaborating user account of the plurality of collaborating user accounts. Further, in one or more embodiments, the series of acts 800 includes resuming the collaborative session from the merged state of the interpreter.

Further, in one or more embodiments, the series of acts 800 includes detecting one or more permissions associated with the first collaborating user account and the second collaborating user account within the merged prompt for accessing one or more content items associated with the first collaborating user account or the second collaborating user account. Furthermore, in one or more embodiments, the series of acts 800 includes requesting access to the one or more content items based on the one or more permissions. Moreover, in one or more embodiments, the series of acts 800 includes sharing the one or more content items within a collaborative session of the large language model according to the one or more permissions.

Further, in one or more embodiments, the series of acts 800 includes generating, by utilizing the large language model to process the merged prompt from the context engine, computer code executable by the interpreter to generate the response. Moreover, in one or more embodiments, the series of acts 800 includes generating the response for providing to the first collaborating user account and the second collaborating user account by executing the computer code utilizing the interpreter communicating with the large language model.

Moreover, in one or more embodiments, the series of acts 800 includes generating, utilizing a context engine associated with a large language model, a first prompt for a first query received from a first collaborating user account among a plurality of collaborating user accounts interacting with the large language model. Further, in one or more embodiments, the series of acts 800 includes generating, utilizing the context engine, a second prompt for a second query received from a second collaborating user account among the plurality of collaborating user accounts interacting with the large language model. Further, in one or more embodiments, the series of acts 800 includes generating, from the first prompt and the second prompt, a merged prompt for providing to the large language model utilizing the context engine. Moreover, in one or more embodiments, the series of acts 800 includes generating, by processing the merged prompt utilizing the large language model, a response for providing to the first collaborating user account and the second collaborating user account.

Further, in one or more embodiments, the series of acts 800 includes an act where the merged prompt includes one or more example functions associated with the first query and one or more additional example functions associated with the second query.

In some implementations, the series of acts 800 includes detecting a conflict among one or more parameters within computer code generated by the large language model processing the merged prompt prior to runtime of the computer code. Moreover, the series of acts 800 can include modifying the computer code by utilizing data propagation to resolve the conflict among the one or more parameters.

Furthermore, in one or more embodiments, the series of acts 800 includes detecting an overlap between a first parameter associated with a first collaborating user account and a second parameter associated with the second collaborating user account within the merged state, wherein the first parameter matches the second parameter. In some implementations, the series of acts 800 includes modifying the merged state by merging the first parameter and the second parameter.

Additionally, the series of acts 800 can include generating, for an interpreter associated with the large language model, a merged state for a collaborative session of the large language model, wherein the collaborative session comprises the plurality of collaborating user accounts synchronously interacting with the large language model. Further, the series of acts 800 can include generating an interpreter state map representing relationships among one or more queries, collaborative sessions, and content items related to the merged state of the interpreter. Moreover, the series of acts 800 includes providing a visualization of the interpreter state map for display on a graphical user interface of a first device associated with the first collaborating user account and a second graphical user interface of a second device associated with the second collaborating user account.

Moreover, in some cases, the series of acts 800 includes generating, by utilizing the large language model to process the merged prompt, computer code executable by an interpreter communicating with the large language model. Additionally, the series of acts 800 includes executing a function defined by the computer code by executing the computer code utilizing the interpreter. In one or more cases, the series of acts 800 includes generating the response based on executing the function of the computer code.

Figure 9:
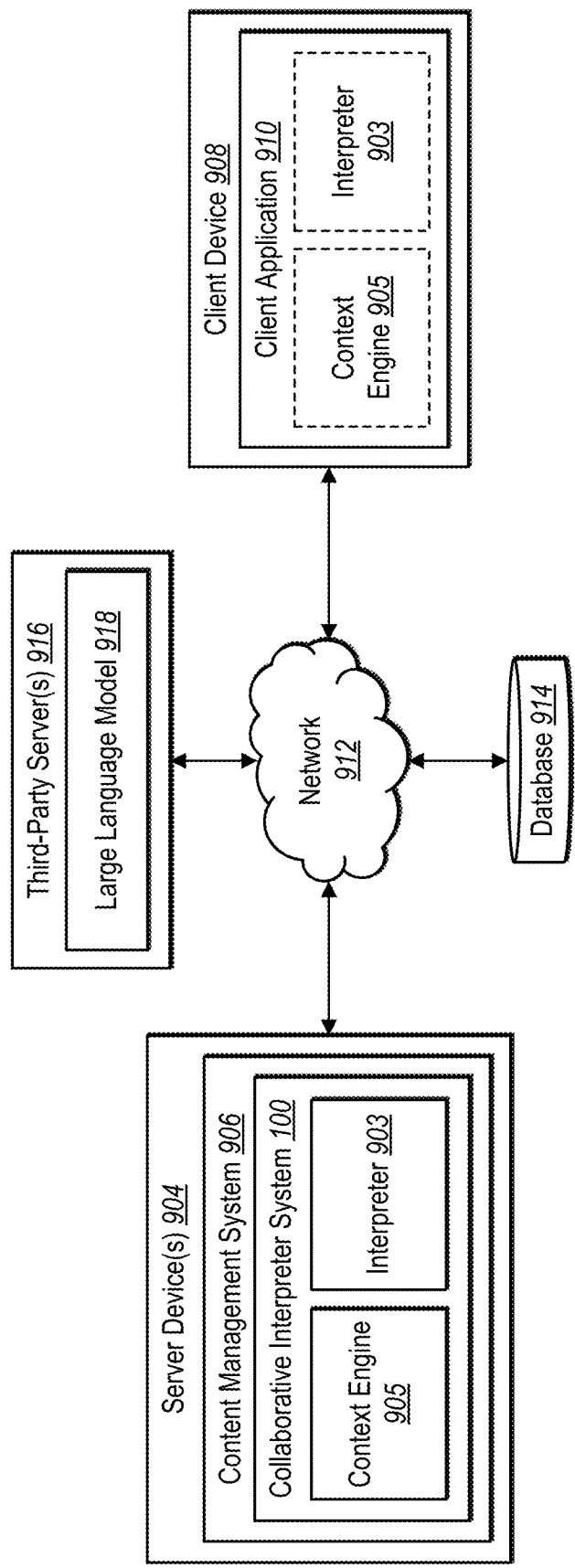
FIG. 9 illustrates a schematic diagram of an example environment of a collaborative interpreter system in accordance with one or more embodiments.

Additional detail regarding the collaborative interpreter system 100 will now be provided with reference to the figures. For example, FIG. 9 illustrates a schematic diagram of an example system environment for implementing a collaborative interpreter system 100 in accordance with one or more implementations. An overview of the collaborative interpreter system 100 is described in relation to FIG. 9.

As shown, the environment includes server(s) 904 with the collaborative interpreter system 100 that includes a context engine 905, which further includes an interpreter 903, a database 914, server(s) 916, and a client device 908. Each of the components of the environment can communicate via the network 912, and the network 912 may be any suitable network over which computing devices can communicate. Example networks are discussed in more detail below in relation to FIGS. 10-11.

As mentioned above, the example environment includes client device 908. The client device 908 can be one of a variety of computing devices, including a smartphone, a tablet, a smart television, a desktop computer, a laptop computer, a virtual reality device, an augmented reality device, or another computing device as described in relation to FIGS. 10-11. The client device 908 can communicate with the server(s) 904 via the network 912. For example, the client device 908 can receive user input from a user interacting with the client device 908 (e.g., via the client application 910) to, for instance, generate and/or modify a merged state of an interpreter or to select user interface elements for interacting with the content management system 906. In addition, the collaborative interpreter system 100 on the server(s) 904 can receive information relating to various interactions with source content items and/or user interface elements based on the input received by the client device 908.

As shown, the client device 908 can include a client application 910. In particular, the client application 910 may be a web application, a native application installed on the client device 908 (e.g., a mobile application, a desktop application, etc.), or a cloud-based application where all or part of the functionality is performed by the server(s) 904. Based on instructions from the client application 910, the client device 908 can present or display information, including a user interface for interacting with (or collaborating regarding) generating responses for a query in an individual session with a large language model or a query in a collaborative session with the large language model 918. Using the client application, the client device 908 can perform (or request to perform) various operations, such as initiating a collaborative session and/or generating a response to a text query.

As illustrated in FIG. 9, the example environment also includes the server(s) 904. The server(s) 904 may generate, track, store, process, receive, and transmit electronic data, such as text queries, a serialized state of an interpreter, a merged state of the interpreter, computer code, interactions with interface elements, and/or interactions between user accounts or client devices. For example, the server(s) 904 may receive an indication from the client device 908 of a user interaction defining a text query. In addition, the server(s) 904 can transmit data to the client device 908 in the form of a response to a text query. Indeed, the server(s) 904 can communicate with the client device 908 to send and/or receive data via the network 912. In some implementations, the server(s) 904 comprise(s) a distributed server where the server(s) 904 include(s) a number of server devices distributed across the network 912 and located in different physical locations. The server(s) 904 can comprise one or more content servers, application servers, container orchestration servers, communication servers, web-hosting servers, machine learning server, and other types of servers.

As shown in FIG. 9, the server(s) 904 can also include the collaborative interpreter system 100 as part of a content management system 906. The content management system 906 can communicate with the client device 908 to perform various functions associated with the client application 910 such as managing user accounts and/or defining text queries. Indeed, the content management system 906 can include a network-based smart cloud storage system to manage, store, and maintain content items and related data across numerous user accounts. In some embodiments, the collaborative interpreter system 100 and/or the content management system 906 utilize the database 914 to store and access information such as content items, data objects, computer code segments, computer code, prompts, text queries, results for text queries, responses to text queries, a merged state of the interpreter 903, a serialized state of the interpreter 903, and other information related to a state of the interpreter 903.

As further illustrated, the environment includes the server(s) 916 that hosts a large language model 918. In particular, the large language model 918 communicates with the server(s) 904, the client device 908, and/or the database 914. For example, the collaborative interpreter system 100 provides domain-specific language segments to the large language model 918, where the domain-specific language segments indicate a context of individual sessions of a plurality of collaborating user accounts with the large language model 918. Indeed, the large language model 918 can include a machine learning model powered by neural networks or other machine learning architectures for generating responses to text queries. For example, the large language model 918 can refer to a ChatGPT model that generates computer-executable code segments for accessing data sources to generate a context-aware response for a query.

Although FIG. 9 depicts the collaborative interpreter system 100 located on the server(s) 904, in some implementations, the collaborative interpreter system 100 may be implemented by (e.g., located entirely or in part on) one or more other components of the environment. For example, the collaborative interpreter system 100 may be implemented by the client device 908 and/or a third-party system. For example, the client device 908 and/or a third-party system can download all or part of the collaborative interpreter system 100 for implementation independent of, or together with, the server(s) 904. In some cases, the collaborative interpreter system 100 houses or hosts the large language model 918 together with the context engine 905 and the interpreter 903.

In some implementations, though not illustrated in FIG. 9, the environment may have a different arrangement of components and/or may have a different number or set of components altogether. For example, the client device 908 may communicate directly with the collaborative interpreter system 100, bypassing the network 912. In addition, the environment can include the database 914 located external to the server(s) 904 (e.g., in communication via the network 912) or located on the server(s) 904 and/or on the client device 908. In some cases, the server(s) 904 and/or the client device 908 can host or house all or part of the large language model 918.

The components of the collaborative interpreter system 100 can include software, hardware, or both. For example, the components of the collaborative interpreter system 100 can include one or more instructions stored on a computer-readable storage medium and executable by processors of one or more computing devices. When executed by one or more processors, the computer-executable instructions of the collaborative interpreter system 100 can cause a computing device to perform the methods described herein. Alternatively, the components of the collaborative interpreter system 100 can comprise hardware, such as a special purpose processing device to perform a certain function or group of functions. Additionally or alternatively, the components of the collaborative interpreter system 100 can include a combination of computer-executable instructions and hardware.

Furthermore, the components of the collaborative interpreter system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the collaborative interpreter system 100 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
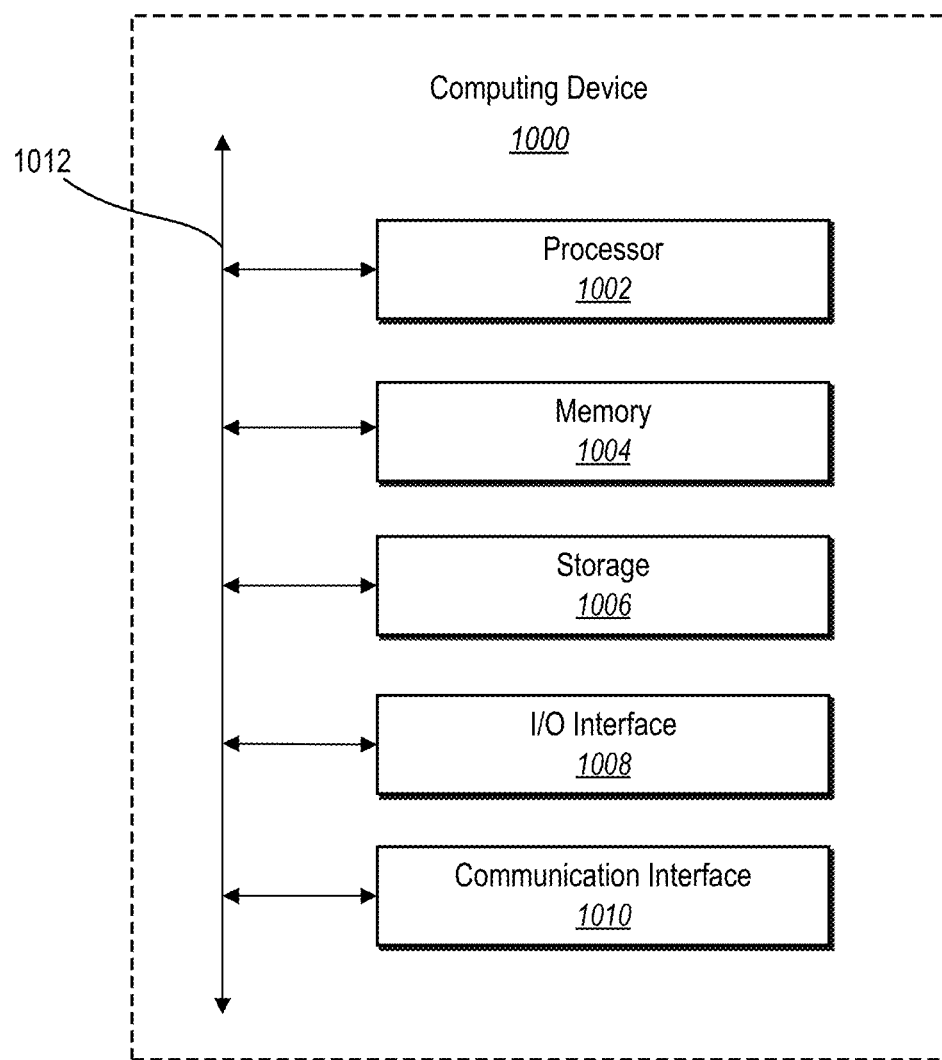
FIG. 10 illustrates a block diagram of an exemplary computing device in accordance with one or more embodiments.

FIG. 10 illustrates a block diagram of exemplary computing device 1000 (e.g., the server(s) 904, the server(s) 916, and/or the client device 908) that may be configured to perform one or more of the processes described above. One will appreciate that server(s) 904 and/or the client device 908 may comprise one or more computing devices such as computing device 1000.

As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
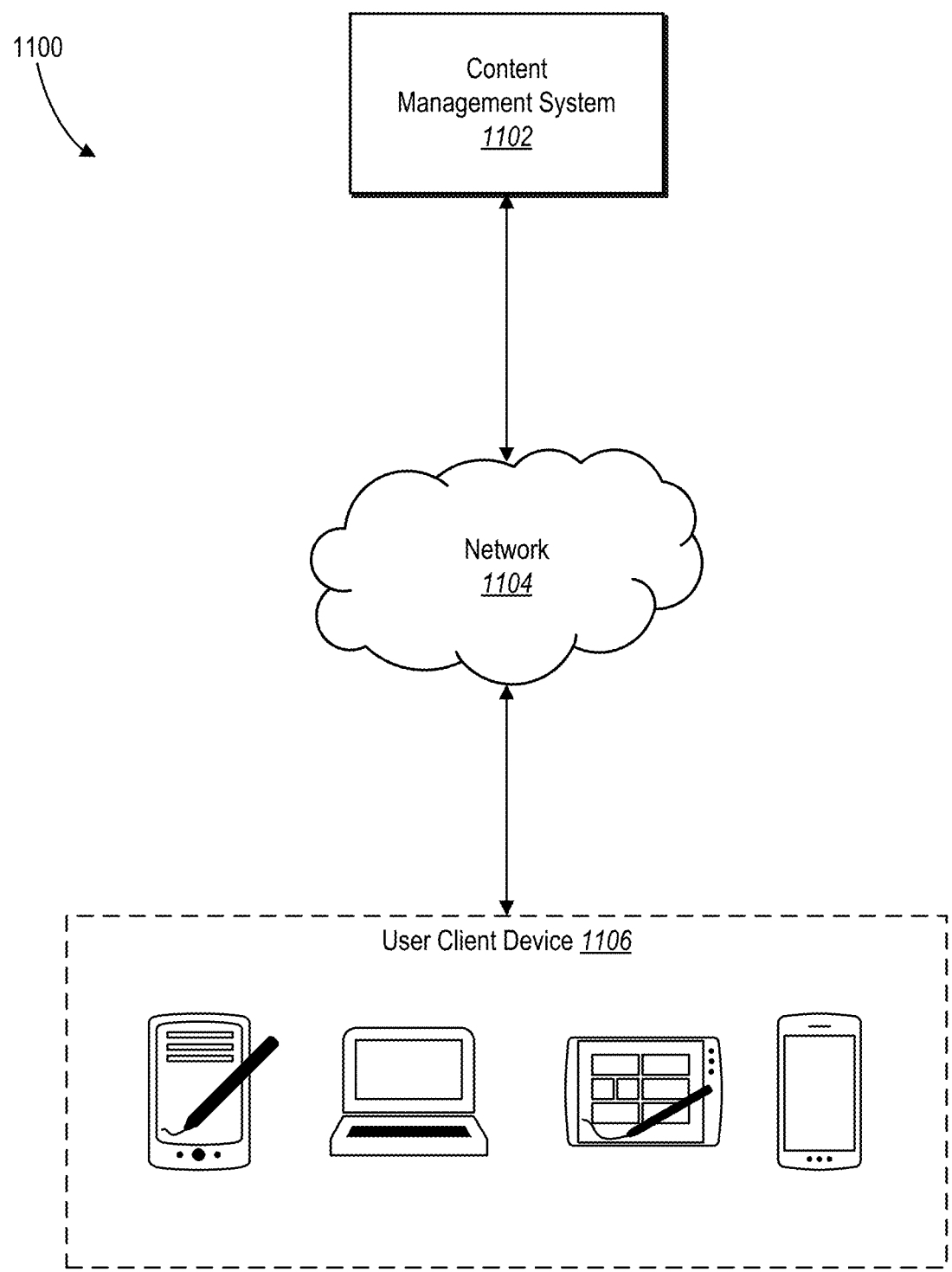
FIG. 11 illustrates an example environment of a networking system having the collaborative interpreter system in accordance with one or more embodiments.

FIG. 11 is a schematic diagram illustrating environment 1100 within which one or more implementations of the collaborative interpreter system 100 can be implemented. For example, the collaborative interpreter system 100 may be part of a content management system 1102 (e.g., the content management system 906). Content management system 1102 may generate, store, manage, receive, and send digital content (such as digital content items). For example, content management system 1102 may send and receive digital content to and from client device of client devices 1106 by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices 1106 associated with one or more users. For example, a user may edit digital content using a client device of the client device 1106. The content management system 1102 can cause client device of the client devices 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the client device of the client devices 1106 only stores reduced-sized versions of the digital content. A user can navigate and browse the reduced-sized versions (e.g., a thumbnail of a digital image) of the digital content on client device of the client devices 1106. In particular, one way in which a user can experience digital content is to browse the reduced-sized versions of the digital content on client device of client devices 1106.

Another way in which a user can experience digital content is to select a reduced-size version of digital content to request the full- or high-resolution version of digital content from content management system 1102. In particular, upon a user selecting a reduced-sized version of digital content, client device of client devices 1406 sends a request to content management system 1102 requesting the digital content associated with the reduced-sized version of the digital content. Content management system 1102 can respond to the request by sending the digital content to client device of client devices 1106. Client device of client devices 1106, upon receiving the digital content, can then present the digital content to the user. In this way, a user can have access to large collections of digital content while minimizing the amount of resources used on client device of client devices 1106.

client device of client devices 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1106 may access content management system 1102.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed:

1. A system comprising:
   at least one processor; and
   a non-transitory computer-readable medium storing instructions which, when executed by the at least one processor, cause the system to:
   receive a first query from a first collaborating user account among a plurality of collaborating user accounts interacting with a large language model;
   receive a second query from a second collaborating user account among the plurality of collaborating user accounts interacting with the large language model;
   generate, from the first query and the second query, a merged prompt for providing to the large language model utilizing a context engine associated with the large language model;
   generate, for an interpreter associated with the large language model, a merged interpreter state by combining a first interpreter state indicating computer code executed by the interpreter based on the first query and a second interpreter state indicating computer code executed by the interpreter based on the second query; and generate, by utilizing the interpreter according to the merged interpreter state, a response for providing to the first collaborating user account and the second collaborating user account.

2. The system of claim 1, further storing instructions which, when executed by the at least one processor, cause the system to generate the merged prompt by:
generating, utilizing the context engine, a first prompt comprising one or more example functions for the first query;
generating, utilizing the context engine, a second prompt comprising one or more additional example functions for the second query; and
combining the one or more example functions of the first prompt with the one or more additional example functions of the second prompt.

3. The system of claim 1, further storing instructions which,
when executed by the at least one processor, cause the system to:
determine the first interpreter state representing a first context for the first query from the first collaborating user account;
determine the second interpreter state representing a second context for the second query from the second collaborating user account; and
generate the merged interpreter state by combining the first interpreter state with the second interpreter state based on the first context relating to the second context.

4. The system of claim 1, further storing instructions which, when executed by the at least one processor, cause the system to:
detect an overlap between a first parameter associated with a first collaborating user account and a second parameter associated with the second collaborating user account within a merged interpreter state; and
modify the merged interpreter state by merging the first parameter and the second parameter.

5. The system of claim 1, further storing instructions which, when executed by the at least one processor, cause the system to:
generate the merged interpreter state for a collaborative session of the large language model, wherein the collaborative session comprises the plurality of collaborating user accounts asynchronously interacting with the large language model;
store the merged interpreter state corresponding to the collaborative session, based on detecting a termination of the collaborative session;
receive a request to resume the collaborative session from the first collaborating user account of the plurality of collaborating user accounts; and
resume the collaborative session from the merged interpreter state of the interpreter.

6. The system of claim 1, further storing instructions which, when executed by the at least one processor, cause the system to:
detect one or more permissions associated with the first collaborating user account and the second collaborating user account within the merged prompt for accessing one or more content items associated with the first collaborating user account or the second collaborating user account;
request access to the one or more content items based on the one or more permissions; and
share the one or more content items within a collaborative session of the large language model according to the one or more permissions.

7. The system of claim 1, further storing instructions which, when executed by the at least one processor, cause the system to:
generate, by utilizing the large language model to process the merged prompt from the context engine, computer code executable by the interpreter to generate the response; and
generate the response for providing to the first collaborating user account and the second collaborating user account by executing the computer code utilizing the interpreter communicating with the large language model.

8. A computer-implemented method comprising:
receiving a first query from a first collaborating user account among a plurality of collaborating user accounts interacting with a large language model;
receiving a second query from a second collaborating user account among the plurality of collaborating user accounts interacting with the large language model;
generating, from the first query and the second query, a merged prompt for providing to the large language model;
generating, for an interpreter associated with the large language model, a merged interpreter state by combining a first interpreter state indicating computer code executed by the interpreter based on the first query and a second interpreter state indicating computer code executed by the interpreter based on the second query; and
generating, by processing the merged prompt utilizing the large language model and by utilizing the interpreter according to the merged interpreter state, a response for providing to the first collaborating user account and the second collaborating user account.

9. The computer-implemented method of claim 8, wherein generating the merged prompt comprises:
generating, utilizing a context engine associated with the large language model, a first prompt associated with the first query;
generating, utilizing the context engine, a second prompt associated with the second query; and
combining the first prompt and the second prompt.

10. The computer-implemented method of claim 8, further comprising:
determining, for the interpreter associated with the large language model, the first interpreter state responding to the first query from the first collaborating user account;
determining the second interpreter state responding to the second query from the second collaborating user account; and
generating the merged interpreter state by combining the first interpreter state with the second interpreter state according to structured data of the first interpreter state and the second interpreter state of the interpreter.

11. The computer-implemented method of claim 8, further comprising:
detecting, within the merged prompt, a conflict between a first parameter defined by the first query from the first collaborating user account and a second parameter defined by the second query from the second collaborating user account; and modifying the merged prompt to resolve the conflict by applying a first collaborator namespace to the first parameter and a second collaborator namespace to the second parameter.

12. The computer-implemented method of claim 8, further comprising:
generating, for the interpreter associated with the large language model, the merged interpreter state for a collaborative session of the large language model, wherein the collaborative session comprises the plurality of collaborating user accounts synchronously interacting with the large language model;
storing the merged interpreter state corresponding to the collaborative session based on detecting a termination of the collaborative session; and
resuming the merged interpreter state based on detecting a new instantiation of the collaborative session of the plurality of collaborating user accounts synchronously interacting with the large language model.

13. The computer-implemented method of claim 8, wherein generating the merged prompt comprises determining one or more permissions associated with the first collaborating user account and the second collaborating user account for providing a context engine access to one or more content items associated with the first collaborating user account and the second collaborating user account.

14. The computer-implemented method of claim 8, further comprising generating, for the interpreter associated with the large language model, the merged interpreter state to maintain a collaborative session of the plurality of collaborating user accounts interacting with the large language model by utilizing a context window algorithm to determine relationships between individual sessions of respective user accounts with the large language model.

15. A non-transitory computer-readable medium storing executable instructions which, when executed by at least one processor, cause the at least one processor to:
generate, utilizing a context engine associated with a large language model, a first prompt for a first query received from a first collaborating user account among a plurality of collaborating user accounts interacting with the large language model;
generate, utilizing the context engine, a second prompt for a second query received from a second collaborating user account among the plurality of collaborating user accounts interacting with the large language model;
generate, from the first prompt and the second prompt, a merged prompt for providing to the large language model utilizing the context engine;
generate, for an interpreter associated with the large language model, a merged interpreter state by combining a first interpreter state indicating computer code executed by the interpreter based on the first query and a second interpreter state indicating computer code executed by the interpreter based on the second query; and
generate, by processing the merged prompt utilizing the large language model and by utilizing the interpreter according to the merged interpreter state, a response for providing to the first collaborating user account and the second collaborating user account.

16. The non-transitory computer-readable medium of claim 15, wherein the merged prompt includes one or more example functions associated with the first query and one or more additional example functions associated with the second query.

17. The non-transitory computer-readable medium of claim 15, further storing instructions which, when executed by the at least one processor, cause the at least one processor to:
detect a conflict among one or more parameters within computer code generated by the large language model processing the merged prompt prior to runtime of the computer code; and
modify the computer code by utilizing data propagation to resolve the conflict among the one or more parameters.

18. The non-transitory computer-readable medium of claim 15, further storing instructions which, when executed by the at least one processor, cause the at least one processor to:
detect an overlap between a first parameter associated with a first collaborating user account and a second parameter associated with the second collaborating user account within a merged interpreter state, wherein the first parameter matches the second parameter; and
modify the merged interpreter state by merging the first parameter and the second parameter.

19. The non-transitory computer-readable medium of claim 15, further storing instructions which, when executed by the at least one processor, cause the at least one processor to:
generate, for an interpreter associated with the large language model, a merged interpreter state for a collaborative session of the large language model, wherein the collaborative session comprises the plurality of collaborating user accounts synchronously interacting with the large language model;
generate an interpreter state map representing relationships among one or more queries, collaborative sessions, and content items related to the merged interpreter state; and
provide a visualization of the interpreter state map for display on a graphical user interface of a first device associated with the first collaborating user account and a second graphical user interface of a second device associated with the second collaborating user account.

20. The non-transitory computer-readable medium of claim 15, further storing instructions which, when executed by the at least one processor, cause the at least one processor to:
generate, by utilizing the large language model to process the merged prompt, computer code executable by an interpreter communicating with the large language model;
execute a function defined by the computer code by executing the computer code utilizing the interpreter; and
generate the response based on executing the function of the computer code.

* * * * *